US009881224B2

(12) United States Patent
Kienzle et al.

(10) Patent No.: US 9,881,224 B2
(45) Date of Patent: Jan. 30, 2018

(54) USER INTERFACE FOR OVERLAPPING HANDWRITTEN TEXT INPUT

(71) Applicant: MICROSOFT TECHNOLOGY LICENSING, LLC, Redmond, WA (US)

(72) Inventors: Wolf Kienzle, Bellevue, WA (US); Kenneth Paul Hinckley, Redmond, WA (US); Mudit Agrawal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 683 days.

(21) Appl. No.: 14/109,001

(22) Filed: Dec. 17, 2013

(65) Prior Publication Data

US 2015/0169975 A1   Jun. 18, 2015

(51) Int. Cl.
*G06K 9/00* (2006.01)
*G06K 9/34* (2006.01)
(Continued)

(52) U.S. Cl.
CPC ........... *G06K 9/34* (2013.01); *G06F 3/04883* (2013.01); *G06K 9/00416* (2013.01); *G06K 9/222* (2013.01); *G06T 1/0007* (2013.01)

(58) Field of Classification Search
CPC ...... G06K 9/34; G06K 9/00416; G06K 9/222; G06F 3/04883; G06T 1/0007
See application file for complete search history.

(56) References Cited

U.S. PATENT DOCUMENTS 5,796,866 A   8/1998 Sakurai et al.
5,870,492 A   2/1999 Shimzu et al.
(Continued)

FOREIGN PATENT DOCUMENTS

CN   2011077942 A1   6/2012
EP      2386984 A2   11/2011
(Continued)

OTHER PUBLICATIONS

"Second Written Opinion Issued in PCT Application No. PCT/US2014/066994", dated Jan. 4, 2016, 6 Pages.
(Continued)

*Primary Examiner* — Stephen R Koziol
*Assistant Examiner* — Timothy Choi
(74) *Attorney, Agent, or Firm* — Lyon & Harr, LLP; Mark A. Watson

(57) ABSTRACT

A "Stroke Untangler" composes handwritten messages from handwritten strokes representing overlapping letters or partial letter segments are drawn on a touchscreen device or touch-sensitive surface. These overlapping strokes are automatically untangled and then segmented and combined into one or more letters, words, or phrases. Advantageously, segmentation and composition is performed without requiring user gestures, timeouts, or other inputs to delimit characters within words, and without using handwriting recognition-based techniques to guide untangling and composing of the overlapping strokes to form characters. In other words, the user draws multiple overlapping strokes. Those strokes are then automatically segmented and combined into one or more corresponding characters. Text recognition of the resulting characters is then performed. Further, the segmentation and combination is performed in real-time, thereby enabling real-time rendering of the resulting characters in a user interface window. A related drawing mode
(Continued)

enables entry of drawings in combination with the handwritten characters.

20 Claims, 10 Drawing Sheets

(51) Int. Cl.
*G06F 3/0488* (2013.01)
*G06K 9/22* (2006.01)
*G06T 1/00* (2006.01)

(56) References Cited

U.S. PATENT DOCUMENTS

| | | | |
|---|---|---|---|
| 6,564,213 B1* | 5/2003 | Ortega | G06F 17/3064 |
| 6,600,834 B1* | 7/2003 | Su | G06K 9/222 |
| | | | 382/177 |
| 6,694,056 B1* | 2/2004 | Ito | G06K 9/222 |
| | | | 382/186 |
| 6,944,472 B1 | 9/2005 | Ishigami | |
| 7,177,473 B2 | 2/2007 | Aharonson | |
| 7,567,239 B2 | 7/2009 | Seni | |
| 7,865,016 B2 | 1/2011 | Sternby | |
| 8,126,827 B2 | 2/2012 | Badger et al. | |
| 2002/0071607 A1 | 6/2002 | Kawamura et al. | |
| 2009/0226091 A1* | 9/2009 | Goldsmith | G06K 9/00436 |
| | | | 382/189 |
| 2010/0277422 A1* | 11/2010 | Muresianu | G06F 1/1692 |
| | | | 345/173 |
| 2012/0293423 A1 | 11/2012 | Dai et al. | |
| 2013/0007606 A1 | 1/2013 | Dolenc | |
| 2013/0314363 A1 | 11/2013 | Zhen | |
| 2014/0171153 A1* | 6/2014 | Kienzle | G06F 3/0237 |
| | | | 455/566 |

FOREIGN PATENT DOCUMENTS

| | | |
|---|---|---|
| EP | 2650767 A1 | 10/2013 |
| WO | 2012024829 A1 | 3/2012 |
| WO | 2012/071730 A1 | 6/2012 |
| WO | 2012/075821 A1 | 6/2012 |

OTHER PUBLICATIONS

International Search Report & Written Opinion for PCT Patent Application No. PCT/US2013/075718, dated Mar. 13, 2014, Filed Dec. 17, 2013, 9 Pages.
Dean, Joseph E. Jr., U.S. Office Action, U.S. Appl. No. 13/716,203, dated Aug. 27, 2015, pp. 1-10.
Cui, Y., V. Lantz, Stroke break analysis: A practical method to study timeout value for handwriting recognition input, Proc. of the 7th Int'l Conf. on Human Computer Interaction with Mobile Devices and Services, MobileHCI '05, Sep. 19-22, 2005, pp. 263-266, ACM New York, NY, USA.
Agrawal, S, I. Constandache, S. Gaonkar, R. R. Choudhury, K. Caves, F. DeRuyter, Using mobile phones to write in air, Proc. of the 9th Int'l Conf. on Mobile Systems, Applications and Services and Co-located Workshops, MobiSys'11, Jun. 28, 2011, pp. 15-28.
Srihari, S. N., Handwriting Recognition, Automatic, in Encyclopedia of Language and Linguistic, K. Brown (ed.), vol. 5, Second Edition, Oxford: Elsevier, pp. 203-211, 2006.
"International Search Report & Written Opinion for PCT Patent Application No. PCT/US2014/066994", dated Feb. 4, 2015, 10 Pages.
Lv, et al., "Learning-Based Candidate Segmentation Scoring for Real-Time Recognition of Online Overlaid Chinese Handwriting", In Proceedings of International Conference on Document Analysis and Recognition, Aug. 25, 2013, 5 pages.
Tonouchi, et al., "Text Input System using Online Overlapped Handwriting Recognition for Mobile Devices", In Proceedings of International Conference on Document Analysis and Recognition, Sep. 23, 2007, 5 pages.
Google, "Handwrite", Retrieved on: Nov. 13, 2013, Available at: http://www.google.com/insidesearch/features/search/handwritinginput/index.html.
Laviola, et al., "MathPad2: A System for the Creation and Exploration of Mathematical Sketches", In Journal of ACM Transactions on Graphics, Aug. 2004, 9 pages.
Seni, Giovanni, "TreadMill Ink—Enabling Continuous Pen Input on Small Devices", In Proceedings of Eighth International Workshop on Frontiers in Handwriting Recognition, Aug. 6, 2002, 6 pages.
Shimodaira, et al., "On-Line Overlaid Handwriting Recognition Based on Substroke HMMs", In International Conference on Document Analysis and Recognition, Aug. 2013, 5 pages.
Bharath, et al., "FreePad: A Novel Handwriting-Based Text Input for Pen and Touch Interfaces", In Proceedings of the 13th International Conference on Intelligent user Interfaces, Jan. 13, 2008, 4 pages.
Zou, et al., "Overlapped Handwriting Input on Mobile Phones", In International Conference on Document Analysis and Recognition, Sep. 18, 2011, 5 pages.
Tinwala, et al., "Eyes-free Text Entry on a Touchscreen Phone", In Proceeding of IEEE Toronto International Conference of Science and Technology for Humanity, Sep. 26, 2009, 6 pages.
Llorens, et al., "The UJI Penchars Database: A Pen-Based Database of Isolated Handwritten Characters", In Proceedings of Language Resources and Evaluation, May 26, 2008, 5 pages.
Freund, et al., "A Decision-Theoretic Generalization of on-Line Learning and an Application to Boosting", In Computational Learning Theory Lecture Notes in Computer Science, vol. 904, Mar. 13, 1995, 34 pages.
"Cocoa Box Design LLC", Retrieved on: Nov. 21, 2013, Available at: http://www.cocoabox.com.
"Gee Whiz Stuff", Retrieved on: Nov. 18, 2013, Available at: http://www.geewhizstuff.com.
Mackenzie, et al., "Phrase Sets for Evaluating Text Entry Techniques", In Proceeding of Extended Abstracts on Human Factors in Computing Systems, Apr. 5, 2003, 2 pages.
Rabiner, Lawrence R., "A Tutorial on Hidden Markov Models and Selected Applications in Speech Recognition", In Proceedings of the IEEE, vol. 7, Issue 2, Feb. 1989, 30 pages.
Ritter, et al., "Unsupervised Modeling of Twitter Conversations", In Proceeding of Human Language Technologies: The 2010 Annual Conference of the North American Chapter of the Association for Computational Linguistics, Jun. 2010, 9 pages.
Saponas, et al., "PocketTouch: Through-Fabric Capacitive Touch Input", In Proceeding of the Annual ACM Symposium on User Interface Software and Technology, Oct. 16, 2011, 5 pages.
Dean, Jr., Joseph E., U.S. Office Action, U.S. Appl. No. 13/716,203, dated Dec. 28, 2016, pp. 1-14.
Dean, Jr., Joseph E., U.S. Notice of Allowance, U.S. Appl. No. 13/716,203, dated Aug. 29, 2107, pp. 1-7.

* cited by examiner

Example User Interface on a Bracelet- or Wristwatch-Based Form Factor with Composited Strokes, HWR Recognition Candidates and Search Suggestions, also Showing Fading Stroke Trail

*Example "Stroke Untangler" Writing Panel (with or without Touchscreen) in a Ring-Based Form Factor for Entry of Overlapping Strokes*

*Handwriting Recognition Models for Broken Characters*

USER INTERFACE FOR OVERLAPPING HANDWRITTEN TEXT INPUT

BACKGROUND

Traditionally, text is entered either using a hardware keyboard (e.g., 12 phone keys or QWERTY keyboard) or a software keyboard (e.g., keys are graphical buttons displayed on a touchscreen display). A major problem with this approach is that the small key sizes on handheld devices make it relatively difficult to type. Often, the keyboard is divided into several parts (letters vs. numbers vs. special characters). This allows the user to switch between parts and only one part is displayed at a time on the screen. This allows for larger buttons per part, but switching causes overhead for the user. Also, as the screen size of mobile devices decreases, users tend to make more mistakes in touching the intended character on the touch screen, thereby decreasing the overall accuracy. As a result, there is a point at which typing on a smaller screen provides no extra value in terms of speed and/or accuracy compared to the more natural user inputs like handwriting recognition.

Consequently, in the case of small screens, handwriting sometimes offers advantages over typing for personal communication. Further, handwritten notes often contain subtle personal cues through writing style and drawings that cannot be expressed by typed text. Many of today's communication devices, such as, for example, smart phones, tablet computers, etc., have touchscreen-based systems that are capable of recording handwriting that is entered on a touchscreen of the device. Several commercial applications employ handwriting for note taking and messaging. Unfortunately, these types of handwriting applications typically require either a stylus, or a surface large enough for a finger to write with sufficient precision. This poses a problem for the small screens of mobile devices.

For example, one conventional handwriting technique provides a phone-based application wherein the user writes characters in the phone's landscape mode. A user touch of the far left side of the screen (or waiting for a timeout) accepts the writing and clears the screen for more input. Unfortunately, this approach requires the user to organize her input spatially such that an "accept and clear" type action is triggered, and so that a proper amount of space surrounds each character, since characters are concatenated by including leading and trailing whitespace. In addition, the landscape orientation of this application necessitates frequent rotation of the device. Another similar application uses a two-finger swipe gesture to manually arrange predefined ink segments on the screen to form individual characters.

In an attempt to address the limited space available for writing with fingers on small screens, various automatic segmentation techniques have been implemented for use in mobile text entry scenarios. Such systems allow letters to be written on top of each other, with those letters then being separated by post-processing. For example, so-called overlapped recognition systems generally operate by evaluating the overlapping strokes to identify the intended characters, and then use that information to segment the strokes. Unfortunately, this means that these systems use a form of text or handwriting recognition that is performed jointly with stroke segmentation as a guide or aid for use in segmenting the strokes, with a resulting increase in complexity and computational overhead requirements. One approach that avoids the character segmentation problem is the use of custom unistroke alphabets where every individual stroke represents a different character. Such techniques can allow eyes-free input, but require the user to learn a new gesture set (i.e., different single strokes for each individual character) to enter text.

Another finger-input handwriting approach allows users to write overlapping characters on a touch surface through fabric. This approach generally recognizes single stroke letters (e.g., "c" or "l") without further user action. However, in order to segment overlapping strokes for more complex characters such as ("k" "t" "f" and "x"), this approach looks for a second specific stroke. In particular, if a "<" "-" "\" or "/" gesture is encountered, this approach simply merges that stroke with the previously entered stroke to produce a character. In other words, this approach either identifies single strokes as characters, or looks for one or more special identifier strokes or gestures to indicate that consecutive strokes are to be merged. Without identifying this type of special character, this system is not capable of segmenting multiple overlapping strokes to determine what character was intended by the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Stroke Untangler," as described herein, provides various techniques for composing handwritten messages on a touchscreen, or other real or virtual writing surface (collectively referred to herein as a "writing panel"), using either a finger or a writing implement. Handwritten strokes representing overlapping letters or partial letter segments are first drawn on the writing panel. These overlapping strokes are then automatically untangled, segmented, and composited into one or more letters, words, or phrases. Advantageously, this untangling, segmenting, and compositing is performed without requiring user gestures (or predefined segments), timeouts, or other inputs to delimit characters within a word. Further, in contrast to existing segmentation techniques, this untangling and segmenting process is performed without using text or handwriting recognition techniques as a guide for use in untangling and segmenting the overlapping strokes entered by the user. However, in various embodiments, recognition of the resulting characters is then performed using various handwriting recognition (HWR) techniques after the untangling and segmenting has been completed.

In view of the above summary, it is clear that the Stroke Untangler described herein provides various techniques for composing handwritten messages from multiple overlapping strokes without requiring predefined gestures or strokes and without using HWR-based techniques as a guide to untangling, segmenting and compositing multiple overlapping strokes to form characters. In addition to the just described benefits, other advantages of the Stroke Untangler will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
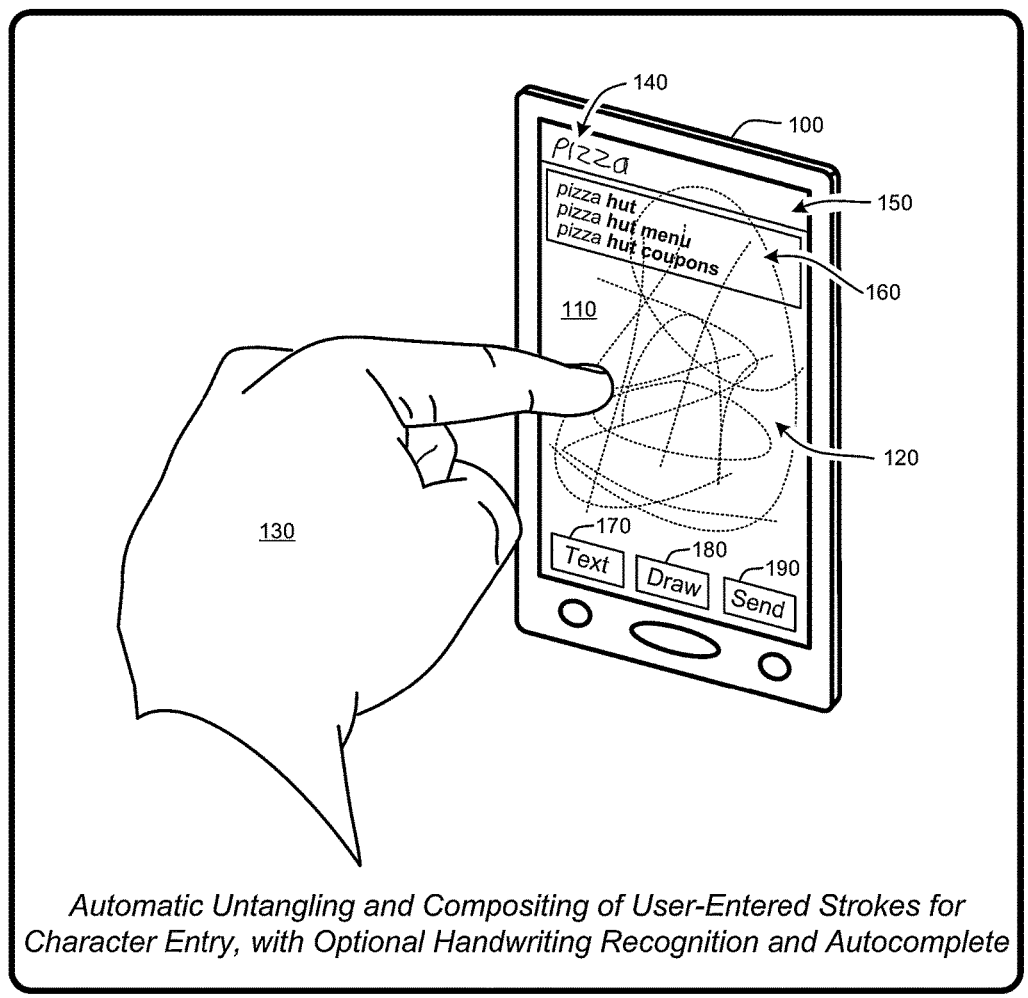
FIG. 1 illustrates the use of a "Stroke Untangler" for automatically untangling, segmenting and compositing multiple overlapping strokes to form characters, words, and phrases, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Stroke Untangler," as described herein, provides various techniques for composing handwritten messages on a touchscreen, or other real or virtual writing surface, using either a finger or a writing implement. Handwritten strokes representing overlapping letters or partial letter segments are first drawn on a touchscreen device or touch-sensitive surface. These overlapping strokes are then automatically untangled, segmented and combined or composited into one or more letters, words, or phrases. Further, the segmentation and combination is performed in real-time, thereby enabling real-time rendering of the resulting characters in a user interface window. In various embodiments, text recognition of the resulting characters is then performed using various handwriting recognition (HWR) techniques after the segmentation has been completed.

In other words, the Stroke Untangler allows the user to continuously or periodically draw multiple overlapping strokes on a touchscreen or touch-sensitive surface. Those strokes are then automatically segmented and combined into one or more corresponding characters. Advantageously, this segmentation and combination is performed without requiring user gestures (or predefined segments), timeouts, or other inputs to delimit characters within a word. However, in various embodiments the Stroke Untangler enables various control gestures to implement functionality such as, for example, backspace to delete characters, space between words, and clear type commands for clearing entire words or phrases. Note that in various embodiments, the user does not enter spaces between words, and the subsequent HWR processing determines word breaks automatically and then inserts spaces between the characters when appropriate.

Further, in contrast to existing HWR-based segmentation techniques for segmenting strokes, the Stroke Untangler segments strokes by grouping overlapping strokes into k-stroke characters without the use of HWR-based segmentation techniques. This enables the Stroke Untangler to untangle and render handwritten messages while preserving users' personal handwriting in a way that maintains an aesthetic quality that is not found in typical recognition systems. Further, these handwritten messages are then inherently in a format that can be presented to various HWR systems for further processing. Note that a related drawing mode enables entry of drawings in combination with the handwritten characters.

Advantageously, stroke segmentation based on the trained segmentation model without using HWR-based techniques as a guide to the segmentation process significantly reduces computational overhead. Further, this approach facilitates unusual words or expressive spellings (e.g., "whoooah"), since the techniques enabled by the Stroke Untangler do not require the use of a dictionary or the like when untangling and segmenting stokes. In addition, character or text recognition following the untangling, segmenting and rendering processes performed by the Stroke Untangler has been observed to use significantly reduced computational overhead relative to existing systems that operate by leveraging various HWR-based character and text recognition techniques to facilitate the initial untangling and segmenting process.

In various embodiments, the Stroke Untangler also provides a full-word "ink display" (i.e., displayed representations of the user entered strokes) that updates in real-time as strokes are untangled, segmented and composited to form characters, thereby creating a very tight feedback loop with the user. In other words, a display of the current stroke input by the user updates displayed characters in real-time using a stroke untangling and segmenting algorithm (see Section 2.3) that periodically updates a resulting character grouping. As noted above, in various embodiments, text or handwriting recognition is subsequently performed on those characters following the untangling, segmenting and compositing process. This capability is further leveraged in various embodiments by providing a graphical user interface (UI) where the resulting characters are displayed adjacent to one or more recognition candidates available for user selection as input into one or more other applications (e.g., texting, search engines, etc.).

For example, FIG. 1 shows the use of the Stroke Untangler implemented via a user interface of a handheld computing device for automatically untangling, segmenting and compositing multiple overlapping strokes to form characters and words. Note that FIG. 1 is not intended to represent all of the features, capabilities, or embodiments of the Stroke Untangler, and that FIG. 1 is intended simply as a basic visual example to introduce some the general concepts being described throughout this document.

In particular, FIG. 1 shows handheld computing device 100 with touchscreen 110. Multiple overlapping strokes 120 (represented by the multiple overlapping dashed curves displayed on the touchscreen 110) are entered by a finger of the user's hand 130. In the embodiment shown in FIG. 1, the Stroke Untangler untangles and segments the overlapping strokes 120 and composites those strokes to form a human-readable collection of characters 140, which appear to spell the word "pizza." This human-readable collection of characters 140 is displayed within a character entry window 150 on the touchscreen 110.

Note that in various embodiments, direct input on a touch-screen is not required. Such strokes could be made on the touchpad of a laptop, for example, or on the back of a mobile device with a contact-sensitive surface. Further, such strokes can be made on one device (e.g., a watch, or touch-sensitive bracelet) and untangled (and presented to the user) on another device (e.g., a desktop computer, electronic whiteboard, or the like). Other examples include the "Touch Cover" or "Touch Cover 2" input devices associated with various Microsoft® Surface™ devices. Such devices include various combinations of capacitive-sensing techniques, pressure-sensing techniques, and proximity-sensing techniques. Such devices can be adapted (via various software or driver modifications) to receive stroke inputs by stroking on or above the tops of one or more of the pressure-sensitive or proximity-sensitive keys rather than merely sensing strokes on-screen or on-touchpad.

Further, in the embodiment shown in FIG. 1, the Stroke Untangler performs automatic handwriting recognition of the human-readable collection of characters 140, which are recognized by an HWR component of the Stroke Untangler to represent the text "pizza" as machine-readable text. This recognized text is then automatically provided as input to a search engine, which in turn returns a collection of user selectable search suggestions (e.g., "pizza hut," "pizza but menu," and "pizza recipe") in suggestion window 160.

Note that in various embodiments, HWR is not performed until an entire word has been entered, as determined by user entry of a space or word separator following stroke entry. In this case, the HWR performs a word-by-word processing of the human-readable characters after each individual word is entered. In related embodiments, recognition is performed on each word or partial word as soon as each stroke is added to the character, even when the word isn't completed yet. The resulting partial recognitions are often helpful to the user. For example, if the user writes "pizz" and the partial recognition is already in error, e.g., system returns "riff", there is a good chance that the word was not written in a manner rthat will be recognizable by HWR-based processing of the corresponding characters and so won't be recognized correctly even when finished. In such cases, the user can chose to start over with this word (e.g., delete one or more characters and re-enter those characters).

Note also that in the embodiment shown in FIG. 1, the user interface of the Stroke Untangler includes buttons (170, 180 and 190) or the like for toggling between text and drawing modes, and for sending either the human-readable collection of characters 140 or the corresponding recognized text as input to another computing device or application (e.g., search, email, texting application, etc.).

Finally, note that since touchscreens are typically capable of receiving input over their entire surface, the Stroke Untangler allows the user entered strokes 120 to be entered on any part of the touch screen, even on top of other user interface windows (e.g., character entry window 150 and suggestion window 160). Advantageously, this increases the usable space in which the user can enter individual character segments. However, portions of the touchscreen can be excluded from stroke entry, if desired. Furthermore, note that a device's touch sensitivity may extend beyond the bounds of its visible screen, such as touch-sensitive bezels on a watch or mobile device, which allow the user's strokes to be fully sensed even when they may extend beyond the bounds of the touch-screen proper.

Examples of additional features and embodiments of the Stroke Untangler include, but are not limited to, various UI elements such as rendering a quickly fading ink trail to provide visual feedback of the path taken by the user's finger across the touchscreen while entering strokes. Another example of a UI element provided by the Stroke Untangler is that as the user moves her finger across the touchscreen while entering strokes, the untangled and segmented "ink" (i.e., a visual representation of the stroke) is displayed above the writing panel.

In another embodiment, various recognition candidates (similar to the search candidates shown with respect to FIG. 1) are provided relative to recognition of the user handwriting. In various embodiments, the user may accept a recognition candidate at any time by tapping on it or otherwise selecting one of the candidates. Recognition candidates may also include predictions, e.g., the system may include the word "pizza" in the recognition candidates, even if the user only wrote "piz" so far. Until a candidate is selected, a copy of the top candidate is shown in the application's edit or text entry control or window. When a candidate is selected, it gets sent to the application's edit control (potentially replacing the top candidate displayed there before). Selecting a candidate may insert a space into the applications edit control after the recognized word so that subsequent words or characters entered by the user are separated from the previous character or word.

In further UI embodiments of the Stroke Untangler, various control gestures are provided via one or more swipe gestures relative to the touchscreen. Example control gestures include deleting characters, deleting words, adding space between characters or words, toggling drawing entry modes, etc. Note that the specific control gestures discussed throughout this document are not intended to limit the specific types of control gestures, the number of control gestures, or the directionality of the swipes or multi-touch inputs used to activate the control gestures usable by various embodiments of the Stroke Untangler.

Figure 2:
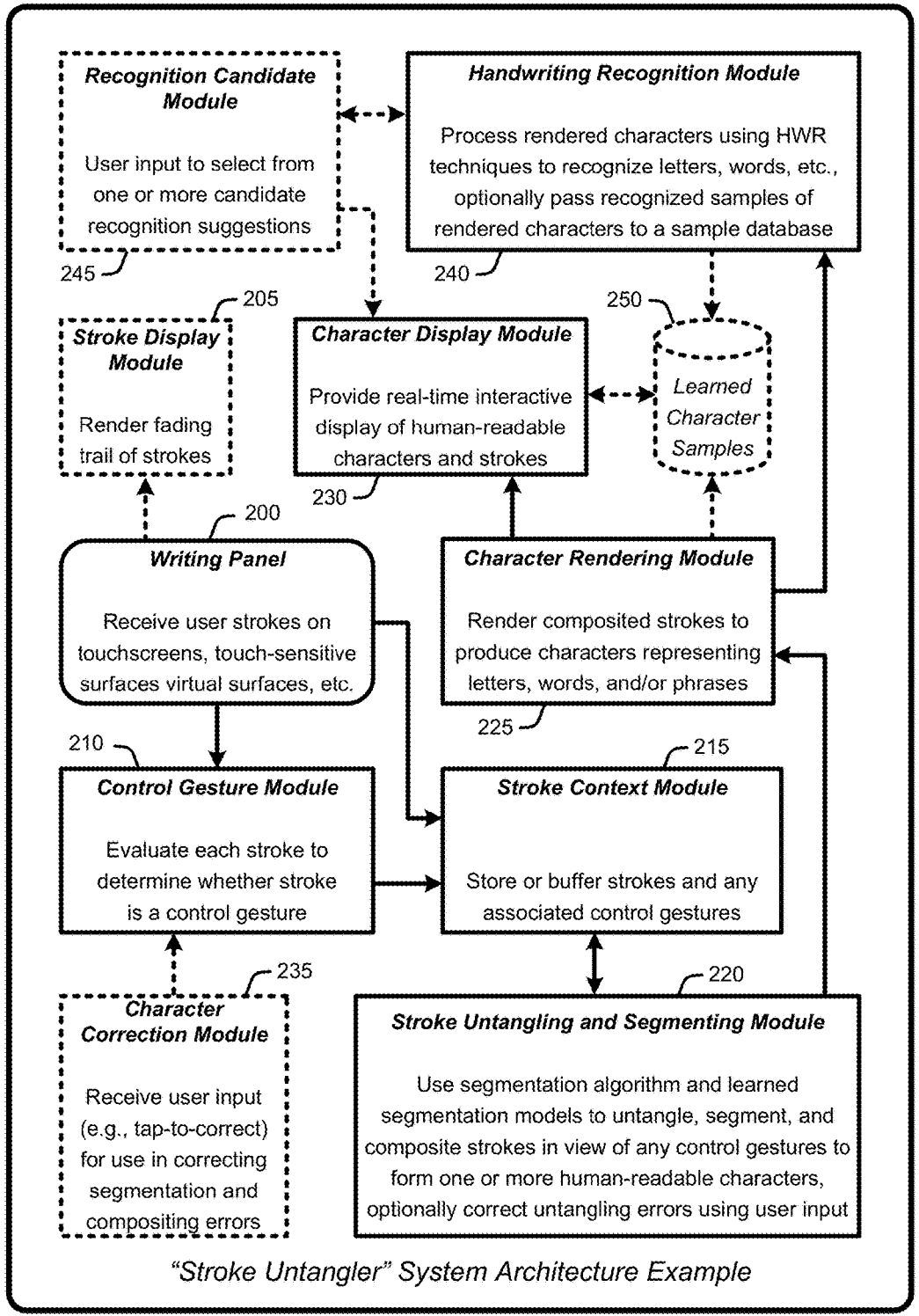
FIG. 2 provides an exemplary architectural flow diagram that illustrates program modules for implementing various embodiments of the Stroke Untangler, as described herein.

1.1 System Overview:

As noted above, the "Stroke Untangler," provides various techniques for composing handwritten messages from multiple overlapping strokes without requiring predefined gestures or strokes and without using HWR-based techniques as a guide to untangling, segmenting and composing multiple overlapping strokes to form characters. The processes summarized above are illustrated by the general system diagram of FIG. 2. In particular, the system diagram of FIG. 2 illustrates the interrelationships between program modules for implementing various embodiments of the Stroke Untangler, as described herein. Furthermore, while the system diagram of FIG. 2 illustrates a high-level view of various embodiments of the Stroke Untangler, FIG. 2 is not intended to provide an exhaustive or complete illustration of every possible embodiment of the Stroke Untangler as described throughout this document.

In addition, it should be noted that any boxes and interconnections between boxes that may be represented by broken or dashed lines in FIG. 2 represent alternate embodiments of the Stroke Untangler described herein, and that any or all of these alternate embodiments, as described below, may be used in combination with other alternate embodiments that are described throughout this document.

In general, as illustrated by FIG. 2, the processes enabled by the Stroke Untangler begin operation by using a writing panel 200 (e.g., a touchscreen, touch-sensitive surface, or other real or virtual writing surface capable of tracking user handwriting) to input multiple handwritten strokes representing overlapping letters or partial letter segments. In various embodiments, a stroke display module 205 optionally renders a fading trail of each user stroke on a touchscreen that follows the user's finger contact with the touchscreen. This provides a visual feedback to the user that shows each stroke while it is being entered.

As each stroke is received, a control gesture module 210 evaluates that stroke distinguish strokes from swipes or other multi-touch inputs representing control gestures. Examples of control gestures include, but are not limited to, swipe gestures to delete the last stroke (e.g., swipe left, crossing left edge of writing panel), delete the last word (e.g., swipe up, crossing top edge of writing panel), mark the end of a word (e.g., swipe right, crossing right edge of writing panel), and switch between text and draw mode (e.g., swipe down, crossing bottom edge of writing panel). Note that examples of control gestures are discussed in further detail below in Section 2.2.2. Each stroke and any control gestures are then stored or buffered to a stroke context module 215.

The stroke context module 215 then passes the buffered strokes and any associated control gestures to a stroke untangling and segmenting module 220. In general, the stroke untangling and segmenting module 220 untangles, segments, and composites the overlapping strokes in view of any control gestures to form one or more characters. As noted above, these overlapping strokes are automatically untangled, segmented and composited without requiring predefined gestures or strokes and without using HWR-based techniques as a guide. An example embodiment of a segmentation algorithm used in this untangling and segmenting process is discussed in further detail below in Section 2.3. Further, this segmentation algorithm operates in combination with one or more trained segmentation models, as discussed in further detail below in Section 2.4 of this document. Note that segmentation is used to combine multiple strokes into individual characters. In other words, segmentation forms groups of strokes representing individual characters.

Once the strokes have been untangled, segmented and composited by the stroke untangling and segmenting module 220, a character rendering module 225 then renders the composited strokes to produce human-readable characters representing one or more letters, words, and/or phrases. A character display module 230 then displays a representation of the rendered characters on the touchscreen used to input the overlapping strokes, or on some other display device associated with the writing panel 200. Note also that the rendered characters produced by the character rendering module 225 can be used for a variety of purposes, including, but not limited to, handwriting-based texting applications where the rendered characters are passed as human-readable images of text to another device or application.

Once the character display module 230 has displayed the rendered characters, the user can see the results of the untangling, segmenting and compositing performed by the Stroke Untangler. Consequently, if there are any errors in this untangling, segmenting and compositing process, the user optionally correct those errors via a character correction module 235 that receives user input for correcting the errors. Note that correction of errors includes, but is not limited to, correcting compositing errors with respect to untangled and segmented strokes (e.g., move one or more strokes from one character to a prior or subsequent character), deleting characters, words or phrases, inserting or adding characters, words or phrases, etc. In various embodiments, the Stroke Untangler provides a "tap-to-correct" user interface (see Section 2.2.6) wherein the user simply taps, touches, or otherwise selects the displayed improperly composited character. Once selected, the stroke untangling and segmenting module 220 then automatically corrects the compositing of one or more characters in view of the information that one or more strokes of the selected character were composited incorrectly.

The character rendering module 225 also passes the human-readable characters resulting from the compositing process to a handwriting recognition module 240. The handwriting recognition module 240 then processes those rendered characters using various HWR techniques to recognize letters, words, etc., and to produce corresponding machine-readable text. Note that a further discussion of the resulting overlapped handwriting recognition is provided below in Section 2.6.

The machine-readable text produced as an output by the handwriting recognition module 240 is then made available to any of a wide variety of applications as a text input. For example, in various embodiments, a recognition candidate module 245 provides one or more autocomplete or recognition suggestions for user selection. User selection of one of these suggestions serves to provide text corresponding to the selected suggestion as input to whatever application (search engine, messaging application, word processor, password input window, etc.) is receiving input from the output of the handwriting recognition module 240. For example, autocomplete suggestions or recognition candidates can include predictions, e.g., suggesting the word "pizza" where the user has only handwritten characters corresponding to "piz". Further, recognition candidates can be drawn from one or more language models or dictionaries based on the partial or complete user input. In addition, search candidates can be retrieved from various search engines based on the based on the partial or complete user input. Note that any or all of these suggestions or search candidates are used in combination in various embodiments of the Stroke Untangler.

In further embodiments, once rendered characters have been recognized, the handwriting recognition module 240 passes samples of corresponding rendered characters, words, and/or phrases to a database of learned character samples 250. By populating this database with samples of each user's own handwriting, these samples can be used for a variety of purposes. For example, when using the recognition candidate module 245 to select one or more autocomplete suggestions, the character display module 230 can retrieve corresponding samples of rendered characters from the database of learned character samples 250 to update the display of rendered characters to correspond to the user selection. The result is a display of letters, words, and/or phrases that are automatically rendered in the user's own handwriting by the character display module. Consequently, as with the rendered characters produced by the character rendering module 225, the characters produced using the database of learned character samples 250 can be used for a variety of purposes, including, but not limited to, handwriting-based texting applications where the rendered characters are passed as human-readable images of text to another device or application.

It should be understood that the discussion in the preceding paragraph regarding single-user-data in the database of learned character samples 250 database is not intended to limit this database to only the user's own handwriting. For example, a corpus of handwriting samples from multiple users is used for initial training of the aforementioned segmentation models. In various embodiments, this corpus can then be augmented with an on-line model with more data from other users or from the specific user of a device. Alternatively, given that this database of learned character samples 250 is used to help render disentangled characters in the user's own handwriting, in the case that the database contains samples from other users, it can also be used to generate character output using samples of another user's handwriting.

Note that correction of any errors summarized above, or the insertion or deletion of characters, words, or phrases, may be performed at any time. Any such corrections or changes will result in corresponding real-time changes in the display of rendered characters by the character display module 230, corresponding real-time changes in the output of the handwriting recognition module 240 and corresponding real-time changes in the output of the optional recognition candidate module 245.

2.0 Operational Details of the Stroke Untangler:

The above-described program modules are employed for implementing various embodiments of the Stroke Untangler. As summarized above, the Stroke Untangler provides various techniques for composing handwritten messages from multiple overlapping strokes without requiring predefined gestures or strokes and without using HWR-based techniques as a guide to untangling, segmenting and composing multiple overlapping strokes to form characters. The following sections provide a detailed discussion of the operation of various embodiments of the Stroke Untangler, and of exemplary methods for implementing the program modules described in Section 1 with respect to FIG. 1. In particular, the following sections provides examples and operational details of various embodiments of the Stroke Untangler, including:

Operational overview of the Stroke Untangler;
Exemplary user interface for interacting with the Stroke Untangler;
Segmentation algorithm for untangling and compositing user strokes;
Training of segmentation models for use by the segmentation algorithm;
Correcting stroke segmentation errors;
Overlapped handwriting recognition; and
Additional embodiments and considerations.

2.1 Operational Overview:

As noted above, the Stroke Untangler-based processes described herein provide various techniques for composing handwritten messages from multiple overlapping strokes without requiring predefined gestures or strokes and without using HWR-based techniques as a guide to untangling, segmenting and compositing multiple overlapping strokes to form characters. Once the untangling, segmenting and compositing process have been completed, the corresponding human-readable characters are passed to an HWR process that evaluates those characters to generate corresponding machine-readable text. The resulting machine-readable text is then made available to a wide variety of applications and devices.

The above summarized capabilities provide a number of advantages. For example, as noted above, stroke segmentation based on the trained segmentation model without using HWR-based techniques as a guide significantly reduces computational overhead. Further, this approach facilitates unusual words or expressive spellings since dictionaries and the like are not used when untangling, segmenting and compositing stokes. In addition, character or text recognition following the untangling, segmenting and compositing process significantly reduces computational overhead relative to existing systems that operate by leveraging text or handwriting recognition techniques to facilitate the initial untangling and segmenting process. Also, the capability to continuously input multiple overlapping strokes without waiting for timeouts or inputting character separators increases the rate at which users can enter characters. Another advantage is that the ability to untangle, segment and composite overlapping strokes means that the Stroke Untangler is well suited for use with writing panels of any size, including, for example, small wristwatch- or ring-type touchscreen-based devices.

2.2 User Interface Examples:

The Stroke Untangler can be implemented in a wide range of form factors, including, but not limited to smartphones, tablets, wristwatch type devices with or without touchscreens, ring-based devices that can be worn on a user's finger, or any other device having a real or virtual writing panel for which overlapping strokes can be tracked. Given the wide range of devices upon which the Stroke Untangler can be implemented, there are many ways in which a user interface that employs some or all of the functionality described herein may be presented. Further, some of the different ways in which the user interface may be presented are related to the size of the screen available on the device. For example, a wristwatch type device having a relatively small screen can display various components (or a different number of components) of the user interface differently than a large tablet or a smartphone. As such, it should be understood that the various user interface examples described throughout this document are provided merely for purposes of discussion and explanation and that the examples discussed herein are not intended to limit the user interface of the Stroke Untangler to the various forms described.

In general, user interfaces for implementing various features of the Stroke Untangler include a writing panel for entering overlapping strokes and various visual feedback mechanisms. These visual feedback mechanisms allow the user to see and interact with the untangled, segmented and composited human-readable collection of characters produced in response to the user-entered strokes. In addition, these visual feedback mechanisms allow the user to see and interact with the machine readable text (including various combinations of recognition candidates, search suggestions, etc.) resulting from the HWR-based processing of the human-readable collection of characters. Both the human-readable collection of characters and the corresponding machine readable text are displayed in various combinations and used in a variety of ways.

In addition, various control gestures are provided for implementing various embodiments of the user interface. Examples of control gestures include, but are not limited to, adding space between words, deleting one or more characters, deleting one or more words, correcting untangling, segmenting and compositing errors, etc. As discussed in further detail herein, these control gestures include stroke-based in various embodiments. However, other control gestures are also used in various embodiments of the Stroke Untangler user interface, including, but not limited to, voice-based control gestures, controls based on touching of real or virtual device buttons, controls based on device motions, controls based on multi-touch or combination gestures, etc.

2.2.1 Writing Panel:

As noted above the Stroke Untangler begins operation by receiving inputs corresponding to one or more overlapping strokes. Consequently, any existing or contemplated technique for tracking such strokes is operable for use by the Stroke Untangler. For example, such techniques include, but are not limited to, the use of touchscreens, touch-sensitive surfaces, drawing pads, or other real or virtual surfaces for which finger (or stylus) strokes can be tracked. For purposes of explanation and discussion, all such surfaces, real or virtual, will generally be referred to herein as a writing panel.

Further, since writing implements (e.g., stylus, pens, etc.) can be tracked in ways similar to tracking fingers, the following discussion will general refer to creating strokes using fingers, with the understanding that the following discussion applies equally to any of the various techniques or tools for creating strokes. Note also that various techniques for tracking strokes relative to arbitrary surfaces, or even in the air, are discussed in further detail below in Section 2.4.

In general, the writing panel covers either a portion or the entirety of a real or virtual surface upon which the user inputs overlapping strokes. In operation, the user can employ her normal writing style to make strokes on the writing panel, using upper and lower case letters, numbers, punctuation, special characters, etc. Depending upon the size of the writing panel and how large the user writes, the writing panel may allow the user to write one or more adjacent characters, each comprising multiple overlapping strokes. The user can position and space the overlapping strokes of the characters horizontally and/or vertically on the writing panel without restriction. In fact, in the case of touchscreens, the overlapping strokes input by the user can encroach into various user interface or input windows or other display areas of the touchscreen. Note that examples of this case were discussed above and illustrated with respect to FIG. 1.

2.2.2 Control Gestures:

As noted above, any of a wide range of control gestures can be implemented for interacting with the user interface of the Stroke Untangler. In a tested embodiment, swipe gestures designed to cross the outer boundary of the writing panel were observed to be easily distinguishable from strokes intended for inputting characters using relatively small computational resources. This allowed the Stroke Untangler to avoid accidental activation of various control gestures. Other embodiments, such as using two-finger swipes or other multi-touch gestures or device motions to distinguish control gestures, are also provided in various implementations of the Stroke Untangler.

For example, in various embodiments, the Stroke Untangler provides a four-direction control system based on swipes that continue across physical edges of the touchscreen. In a tested embodiment, these swipes or control gestures included a "backspace" gesture to delete prior strokes or characters by swiping across the left edge of the writing panel. Similarly, swiping across the right edge of the writing panel inserts a space (equivalent to tapping the current top recognition candidate) for automatically starting a new character or word that is separate from the previously entered character or word. Swiping up across the top edge of the writing panel clears all ink and/or candidates from the screen. Finally, swiping down across the bottom edge of the writing panel toggles a drawing mode that allows the user to enter images via multiple strokes without compositing those strokes into individual characters.

2.2.3 Display Screen:

The user interface of the Stroke Untangler includes a display screen (e.g., the touchscreen of a device on which the Stroke Untangler is implemented, or some other screen in communication with the Stroke Untangler. In general, the display screen shows one or more lines of the handwritten text that is untangled, segmented and composited from the overlapping strokes input by the user. A rendering of the current stroke (the one that is being drawn on the writing panel) gets updated on the writing panel upon each touch event (including stroke inputs, stroke or character deletions via control gestures, entry of spaces between characters, etc.).

In other words, strokes are untangled, segmented and composited with one or more prior strokes to form characters, or segmented and used to start new characters, as a real-time process. This allows the user to visually verify her input as soon as it has been made. As a result, the display screen shows the current state of the characters forming the user input evolving in real-time as the user writes on the writing panel.

Note that as illustrated by FIG. 1, in various embodiments, the composited characters (e.g., human-readable collection of characters 140) are scaled (i.e., reduced in size) to fit within virtual bounding boxes arranged within the character entry window 150 so that those characters can be displayed on the screen in a manner that allows other elements of the user interface to be implemented. Note that in various embodiment, each of the characters being constructed from segmented and composited strokes is scaled using the same relative scaling (e.g., all human-readable characters reduced by 80%) rather than scaling each character individually to fit within the aforementioned bounding boxes. In other words, in various embodiments, all strokes are scaled using the same scaling. Alternately, the resulting human-readable characters are scaled to fit in bounding boxes.

When laying out a segmented word (i.e., one or more segmented characters each comprising generated from one or more overlapping strokes) for display, the Stroke Untangler automatically segments or groups strokes by character and aligns corresponding characters (or the bounding boxes used for each character) horizontally, separated by small spaces (e.g., about one stroke width). A wider horizontal space can be inserted at the end of each word to improve readability of the human-readable collection of character. Character positions are not typically adjusted vertically, however, in various embodiments, assorted alignment or layout settings allow characters to be adjusted relative to each other in any way desired (e.g., horizontally, vertically, diagonally, along an arbitrary curve, increased or decreased spacing, etc.).

In various embodiments, the Stroke Untangler retains relative stroke positions from the writing panel within each character. In some cases the assumptions behind this simple scheme do not hold, e.g., if a user puts down the device in the middle of a symbol and tries to finish later. In such cases, the Stroke Untangler automatically determines a more likely position for the stroke based on the trained segmentation models used in the untangling and segmenting process.

2.2.4 Visual Feedback:

Visual feedback (rendering ink strokes) helps the user check which part of a letter (or word) they have written so far. However, the fact that letters are written on top of one another creates a complexity that the user is not typically interested in seeing. In other words, rendering all strokes on the display screen and leaving those strokes for some period of time would mean rendering multiple characters cluttered on top of each other. Consequently, various embodiments of the Stroke Untangler user interface handle this issue in different ways, some or all of which can be selected or adjusted via a configuration menu or the like associated with the Stroke Untangler user interface.

For example, in one embodiment, strokes are simply not displayed, except for the scaled version of those strokes that are used to form the human-readable collection of characters, as discussed above. In the case of touchscreens, in various embodiments, the Stroke Untangler provides optional visual feedback on the writing panel in the form of fading stroke trails that track the user's strokes across the touchscreen. In still other embodiments, the overlapping strokes are displayed until the segmentation performed by the Stroke Untangler begins a new character, at which time the prior strokes are cleared and the new overlapping strokes begin to be displayed by the Stroke Untangler. Again, any or all such modes can be selected and used in various implementations of the user interface.

As noted above, the Stroke Untangler processes the human-readable collection of characters created from the overlapping strokes using various HWR techniques to create machine readable text. Note that handwriting recognition techniques are well known to those skilled in the art and will not be discussed is significant detail herein.

Figure 3:
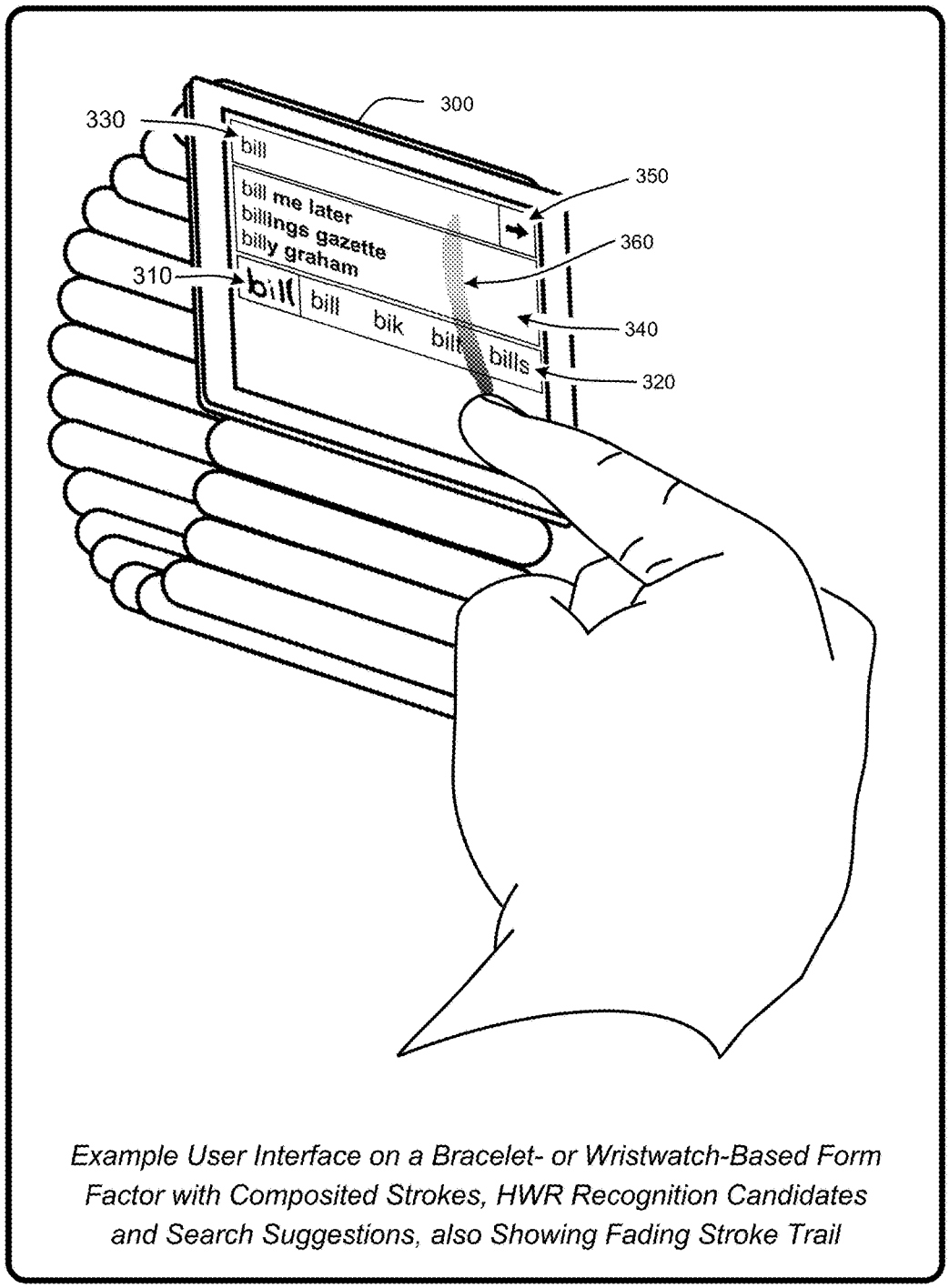
FIG. 3 illustrates an exemplary Stroke Untangler user interface in a bracelet- or wristwatch-based form factor showing a display of untangled, segmented and composited strokes, a display of HWR-based recognition candidates, a display of search suggestions, and a fading stroke trail to provide the user with visual feedback, as described herein.

With respect to the various user interface aspects of this HWR process, in various embodiments, the Stroke Untangler displays the current handwritten word or characters adjacent to the recognition candidates (or in any other desired location on the display screen). An example of this embodiment is shown in FIG. 3, along with several additional user interface elements. For example, in response to untangling and segmenting the users input of overlapping strokes, a touch-screen based computing device 300, which in this case is presented in a bracelet- or wristwatch-based form factor, displays a rendering of a human-readable collection of characters 310, which in this case appear to spell the word "bill." As noted above, the untangling, segmenting, compositing and rendering of these human-readable characters is performed in real-time as the user is inputting those strokes.

Adjacent to the human-readable collection of characters 310 is a set of one or more user-selectable HWR recognition candidates 320. In the embodiment shown, these recognition candidates 320 are sorted from left to right as most likely to least likely candidates, so that the most likely candidate is adjacent to the corresponding human-readable collection of characters 310. User selection of one of those recognition candidates 320 serves to inform the Stroke Untangler of the correct text, and also makes the corresponding machine-readable text available to one or more additional applications.

For example, in the user interface embodiment shown in FIG. 3, the most likely recognition candidate 320, which in this case is the text "bill" (or whatever other recognition candidate is selected by the user), is also provided to an input field 330 of a search engine. As with many search engines, as soon as an entry is provided to the input field 330 by the Stroke Untangler, but before the search is actually performed, a set or list of user-selectable search candidates 340 based on the partial user input is provided. Upon user selection of any of those search candidates 340, or upon user selection of a search button 350 or the like, a search is performed, with the results being displayed in place of the search candidates (or on any other portion of the display screen). Note also that FIG. 3 shows an example of a fading stroke trail 360 that tracks the user's current stroke input as it is also being untangled, segmented, composited and rendered to create the human-readable collection of characters 310.

In other words, the example user interface of FIG. 3 shows a display of the untangled and segmented user strokes as human readable characters adjacent to a set of one or more HWR recognition candidates. This user interface example also shows a search engine input window complete with search suggestions based on either the top HWR recognition candidate or a user selected one of the HWR recognition candidates. Updates to the human-readable collection of characters occurs in real-time along with corresponding real-time updates to the HWR recognition candidates and corresponding real-time updates to the search suggestions. The real-time visual feedback provided to the user as a result of these updates has been observed to allow users to rapidly perform searches based on user-entered handwritten text without the need to use a real or virtual keyboard. Note also that similar user interfaces can be used to provide input to applications other than search engines (e.g., messaging applications, word processors, or any other application making use of machine-readable text inputs).

One advantage of these multiple levels of visual feedback with user-selectable recognition candidates and search suggestions, is that even where there are errors in untangling, segmenting and compositing of strokes or in the HWR-based recognition of the resulting characters, it is likely that one of the candidates or suggestions will correspond to the intended user input. As such, this type of user interface has been observed to decrease overall handwriting entry error rates by providing the user with multiple options to select the correct text.

2.2.5 Drawing Mode:

Various embodiments of the Stroke Untangler user interface allow the user to add small drawings to the text. A drawing differs from a character in that stroke segmentation is turned off during its composition. To compose a drawing, the user brings the interface into draw mode by using the aforementioned down-swipe control gesture, by toggling a draw button, or by using any other desired control gesture.

In contrast to the untangling and segmenting process performed to generate characters from overlapping strokes, in the drawing mode, drawings are typically custom creations that require potentially many strokes and a magnified view during composition. As such, in various embodiments, the Stroke Untangler user interface provides a visual indication to alert the user that the system is in the drawing mode. For example, in various embodiments (e.g., button 180 of FIG. 1), a draw mode toggle button is selected or otherwise highlighted to indicate that the system is in the drawing mode even if there are no strokes on the writing panel. Note that deletion gestures can be used in draw mode as well. To finish a drawing, the user either toggles the draw mode button or makes a word-end gesture. Drawings are treated as words when the message is displayed, i.e., they are separated from adjacent words or drawings by whitespace. There is no limit on the number of drawings in a message.

In a tested embodiment of the Stroke Untangler, each stroke included a bit that indicates whether it was entered in draw or text mode so that subsequent editing of the drawings or text can be performed, and so that the HWR-based recognition processes can skip the drawings when performing recognition of the human-readable collection of characters. For example, assume the user "backspaces" through a number of strokes and eventually deletes the last stroke of a drawing. At that point the Stroke Untangler user interface automatically switches to the drawing mode and displays all strokes of that drawing on the writing panel, so that the entire drawing can be edited. Likewise, the Stroke Untangler user interface reverts to text entry mode (i.e., capturing overlapping strokes of user-entered characters) if the user "backspaces" through the entire drawing.

Figure 4:
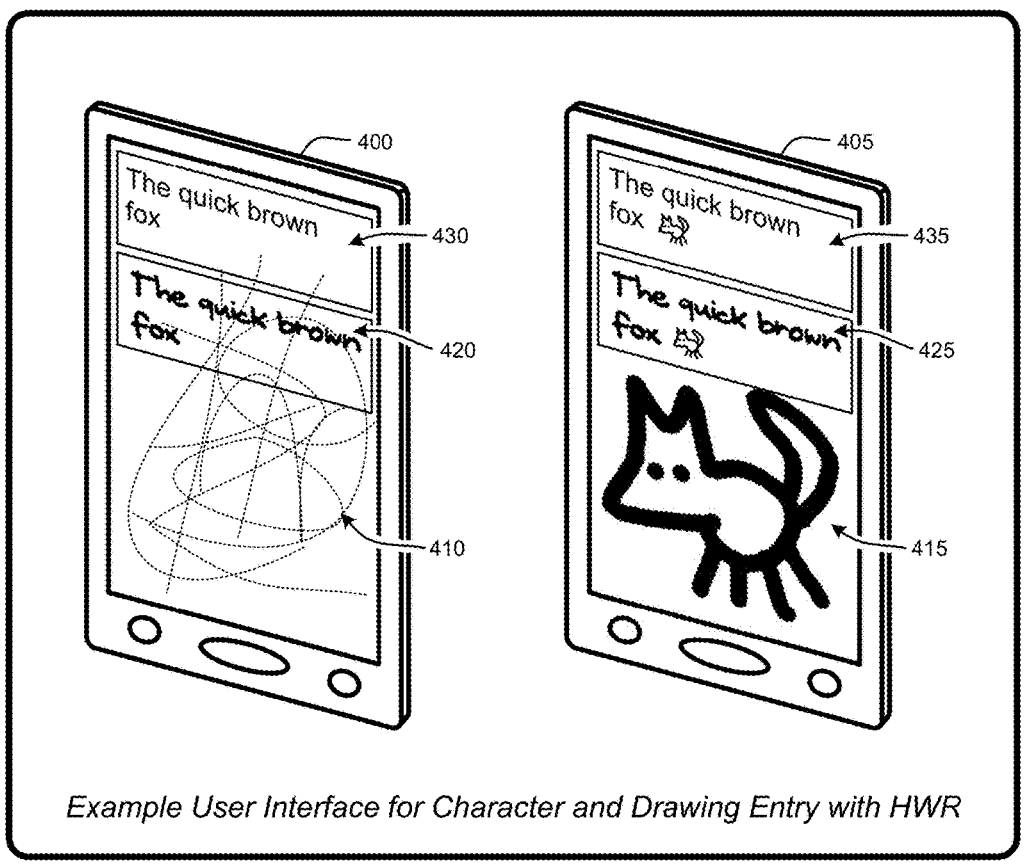
FIG. 4 illustrates an exemplary Stroke Untangler user interface showing a display of untangled, segmented and composited strokes in combination with a display of corresponding HWR-based machine-readable text and a drawing entry.

FIG. 4 provides an illustration of the combined use of character and drawing entry via another example of the Stroke Untangler user interface. In particular, as noted above, in various embodiments, the Stroke Untangler user interface enables the user to input finger-drawn images along with the overlapping strokes used to input characters. For example, the device 400 on the left of FIG. 4 shows the result of untangling and segmenting overlapping strokes 410 as a human-readable collection of characters 420 that appear to spell the words "the quick brown fox". In addition, HWR-based processing of the human-readable collection of characters 420 results in a display of corresponding machine-readable text 430, as illustrated. Note that in various embodiments, both the human-readable collection of characters 420 and the corresponding machine-readable text 430 are user-selectable and user-editable.

Further, the device 405 on the right of FIG. 4 shows the result of adding a drawing 415 to the previously entered of human-readable collection of characters 420. In this case, since the drawing 415 was added subsequent to the entry of the human-readable collection of characters 420, that drawing is then scaled to fit with the human-readable collection of characters and presented in combination with those characters (see element 425).

Note also that in the example shown, the drawing is also presented in combination with the corresponding machine-readable text (see element 435). Advantageously, in this case, both the machine-readable text and the drawing can be saved for later use or presented as input to any other application, such as, for example, a search engine that then performs a joint search on both the machine-readable text and the image. Alternately, image-based searches can be performed using the drawing 415 as input.

2.2.6 Tap-to-Correct:

As with any system that interprets natural user input, there are cases when the output does not match the user's intent. In the case of the segmentation algorithm used by the Stroke Untangler, such errors result in characters fully or partially rendered on top of each other, or broken up into pieces. As such, in various embodiments, the Stroke Untangler user interface provides various techniques that allow the user to correct segmentation and compositing errors of the human-readable collection of characters resulting from the untangling and segmentation processes.

For example, assume that the user intends to write "clean" but the untangling process erroneously segments the strokes to produce "dean". Then, when the user the user simply taps or otherwise selects the "d", the segmentation will be automatically corrected to separate the strokes forming the "d" character into separate "c" and "l" characters.

Figure 5:
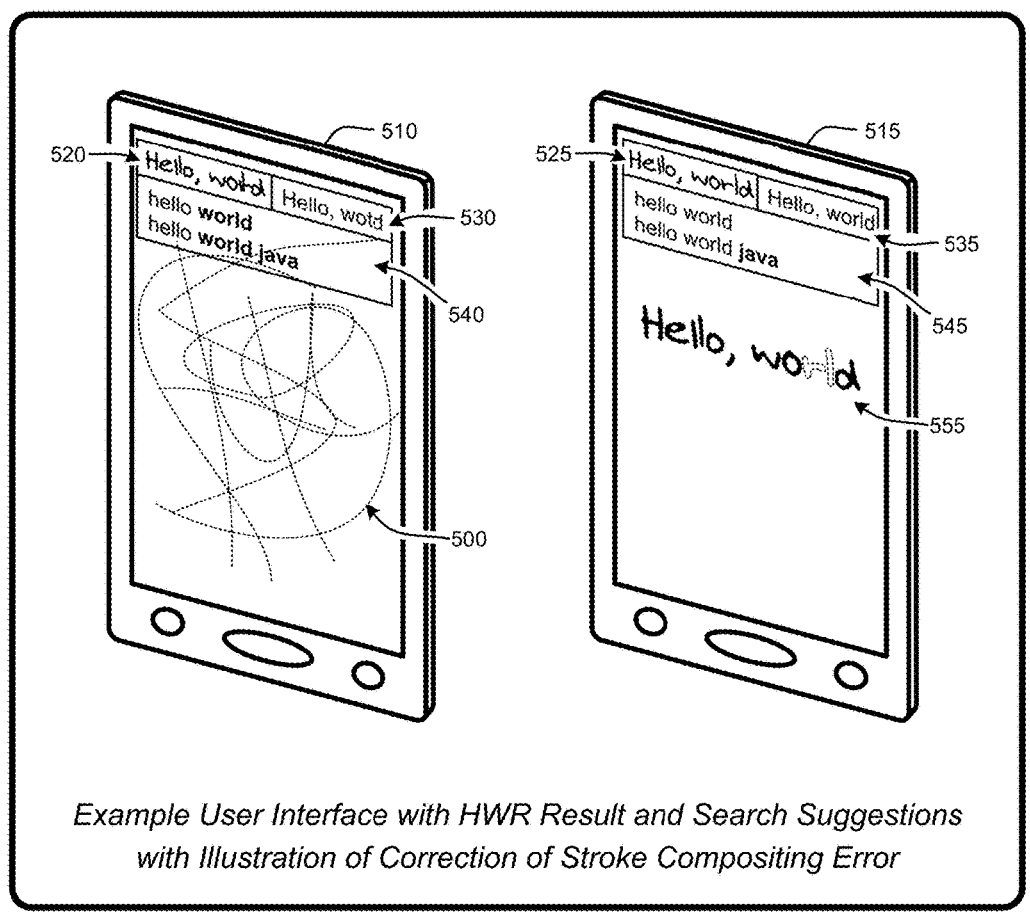
FIG. 5 illustrates an exemplary Stroke Untangler user interface showing a display of untangled, segmented and composited strokes in combination with a display of corresponding HWR-based machine-readable text, search suggestions, and user correction of stroke segmentation errors.

FIG. 5 illustrates an example of the Stroke Untangler user interface that includes a tap-to-correct control gesture that automatically corrects improperly segmented strokes with a corresponding automatic correction of the compositing of those strokes into the corrected human-readable collection of characters.

For example, as illustrated by FIG. 5, multiple overlapping strokes 500 input on a touchscreen of device 510 are automatically untangled, segmented and composited to form the human-readable collection of characters 520 that appear to spell the words "hello wotd". Further adjacent to the human-readable collection of characters 520 is the corresponding results of the HWR-based processing that result in a display of the machine-readable characters 530 that spell "hello wotd". One interesting feature of this exemplary user interface, is that a search suggestion window 540 provides suggested search terms based on the machine-readable characters 530.

In this case, the search suggestions returned by the search engine are actually correct with respect to the intended user input. In particular, the device 515 on the right of FIG. 5 shows the result of user selection (e.g., user "tap" on the displayed character) of the human-readable character appearing to represent the character "t" within the collection characters appearing to spell "wotd". In this example, the Stroke Untangler automatically re-segments the strokes, displays the resulting corrected human-readable characters 525 the corresponding machine-readable characters 535 on the display screen with the corrected segments and corresponding characters highlighted (see element 555).

Note that the display of the corrected segments and corresponding characters highlighted (see element 555) can be presented for a predetermined period of time or presented until dismissed by the user. Further, as illustrated in this example, in various embodiments, the corrected segments and corresponding characters highlighted (see element 555) can be presented in a larger view to present those characters to the user in a format that enables easier editing in case the user desires to make further edits.

Note that in the example of FIG. 5, with the user input corrected to read "hello world", as originally intended, the displayed search suggestions are still the same. This is not the case for every segmentation error, but it is the case in a very high percentage where segmentation errors occur. As such, the user is able to quickly enter or select the intended input even if errors are made in the untangling, segmentation and compositing of strokes when forming the human-readable collection of characters.

Note the exemplary techniques for correcting segmentation errors are discussed in further detail in Section 2.5.

2.3 Segmentation Algorithm:

In general, the Stroke Untangler user interface allows the user to mark word boundaries by means of a space gesture or any other control gesture for marking the end of a word. Strokes within a word are automatically segmented into characters using the techniques described below with respect to the stroke segmentation presented in FIG. 6 (which is used to implement various embodiments of the stroke untangling and segmentation module 220 of FIG. 1).

Figure 6:
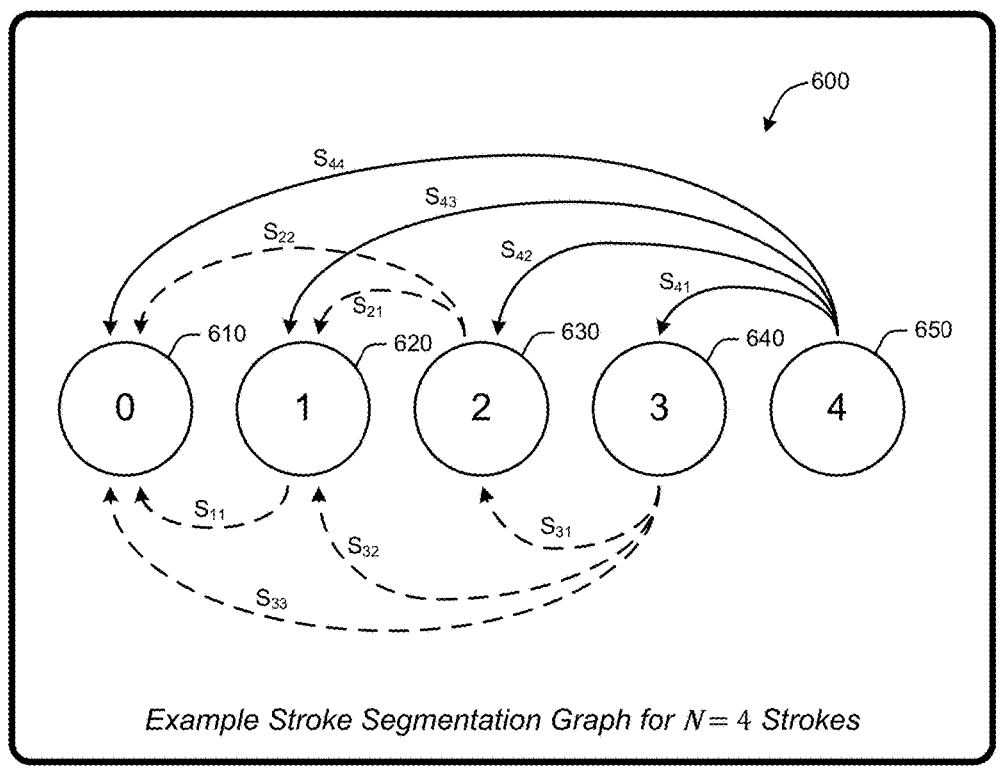
FIG. 6 illustrates an exemplary state diagram for use in performing stroke segmentation for untangling and compositing multiple user strokes to form one or more characters, as described herein.

In particular, FIG. 6 shows an exemplary stroke segmentation graph 600. The stroke segmentation graph 600 comprises a plurality of nodes 610 to 650 (with each node representing a corresponding segmentation model, see discussion of segmentation models in Section 2.4). In the example shown, the stroke segmentation graph 600 can be employed to represent handwritten characters that are composed through 1 to 4 strokes since this number of strokes is generally sufficient for most characters. However, it should be understood that any number of strokes can be segmented by increasing the number of nodes in the segmentation graph. In any case, in the example of FIG. 6, any path from node 4 (i.e., element 650) to node 0 (i.e., element 610) represents a stroke segmentation, wherein a score of such segmentation is a sum of traversed edge weights, $s_{ik}$, and wherein visited nodes mark character ends.

In an exemplary embodiment, the segmenting algorithm of the Stroke Untangler operates to segment arbitrary words or characters consisting of N strokes. For every stroke i=1, . . . , N, four scores $s_{ik}$, k=1, . . . , 4 can be computed, wherein each score describes how likely stroke i is the last stroke in a k-stroke character. FIG. 6 depicts a segmentation graph where N=4, and includes N+1 nodes; one node for each stroke i=1, . . . , N plus one extra start node 610 labeled 0, wherein the graph 600 includes directed edges pointing from each node back to its (up to) four predecessors. An edge from node i to node i−k corresponds to grouping strokes (i−k+1), . . . , i into one character and is weighted by the corresponding score $s_{ik}$. A path from node N to node 0 represents a segmentation of the N strokes into characters. Predicting the most likely segmentation amounts to locating a path with a maximum sum of edge weights. As should be understood by those skilled in the art, this is a shortest path problem that can be solved efficiently using dynamic programming in O(N) time and space.

2.4 Segmentation models:

In general, the segmentation Algorithm makes use of one more trained segmentation models for use in segmenting strokes. These trained segmentation models are used by the segmentation algorithm to compute end-of-character scores as $s_{ik}=f_k(v_i)$, where $v_i$ is a vector of features describing stroke i and $f_k$ is a statistical model of how likely a stroke is the last one in a k-stroke character. In other words, these models determine when strokes of one character end, with subsequent strokes then being segmented into the next character. The character-by character segmentations of multiple overlapping strokes are then composited into each corresponding human-readable character, as discussed throughout this document.

In various embodiments, the feature vector $v_i$ includes numerous values, including bounding box positions for stroke entry, dimensions, area, aspect ratio, stroke length, a multi-bin slope histogram, slopes at the beginning and end of the stroke, amongst others. The feature vector can also hold similar values for strokes neighboring in time in both directions (i.e., prior and subsequent neighboring strokes). For example, the feature vector can hold similar values for two strokes neighboring in time in both directions (i−2), . . . , (i+2), provided that such strokes exist (missing entries in $v_i$ can be set to some default value, such as −1, to indicate that no value exists for the particular entry). Furthermore, bounding box features for stroke entry can be employed to ascertain the union and intersection of neighboring bounding boxes for stroke entry. Note that these bounding boxes on the touch screen for stroke entry should not be confused with the optional bounding boxes used to scale the human-readable characters rendered from the untangled and segmented strokes discussed above in Section 2.2.3.

In a tested embodiment of the Stroke Untangler, boosted decision stumps were employed for learning the end of character segmentation models: $f_k(v_i)=\Sigma_{j=1}^{n}h_{jk}$ (VD, e.g. sums of n step functions $h_{ik}$ on the individual dimensions of $v_i$. Note that in this tested embodiment, models were trained discriminatively using end of-k-stroke-character strokes in the training data as positive examples and the remaining strokes as negative examples. In addition, it should be understood that other computer learning or modeling techniques can be used construct the end of character segmentation models used by the untangling algorithm, and that the use of boosted decision stumps is described only for purposes of explanation.

2.4.1 Model Training:

Training of the segmentation models for the nodes of the segmentation graph can be accomplished using a variety of techniques. For example, in a tested embodiment, manually entered stroke data for known phrases were recorded, with manually labeled character boundaries, and used to train four segmentation models (for the case of a four node segmentation graph). However, this type of manual data entry can be slow and less accurate unless large amounts of data are entered.

Consequently, in a tested embodiment, significantly more training data was generated by automatically simulating strokes using a publicly available data set of including thousands of handwritten English characters from a large group of writers and a corpus of the most frequent words in observed in a typical online messaging system. Note that other languages and character sets, such as, for example, Chinese, Indic scripts, etc., may be used to generate language-specific segmentation models.

To simulate a word entered on the writing panel, a random word was taken from the messaging system corpus. Then, for each character, a set of ink strokes was retrieved from the handwriting data set. The position and size of the simulated strokes were randomly perturbed such that their mean and variance matched the data from manually created (but real) data set discussed above. Relative stroke positions within a character were not randomized since it was assumed that relative stroke positions are typically preserved within a character when the user is entering strokes on the writing panel. These techniques were used to generate very large numbers of strokes that were used to train the segmentation models. In a tested embodiment, models were trained with n=256 stumps each (i.e., using the boosted decision stumps noted above). Note that more or fewer stumps may be employed in this process, depending on the available training data and on the desired model fidelity.

2.5 Correcting Stroke Segmentation Errors:

As discussed above with respect to FIG. 5, errors may sometimes occur when untangling and segmenting strokes, with the result that one or more of the strokes of characters that are intended to be human-readable are fully or partially rendered on top of each other, or broken up into pieces in an incorrect manner. The Stroke Untangler provides various techniques for addressing such errors.

In general, when the user indicates (e.g., tap-to-correct, or otherwise selects or designates) that one or more characters are displayed or rendered incorrectly, the Stroke Untangler automatically re-segments the selected character or characters by determining a most likely alternate segmentation of one or more of the selected and neighboring strokes.

In particular, with respect to one or more character that are displayed incorrectly due to a segmentation error, the Stroke Untangler identifies a closest sequence of one or more characters to the tap or selection location. The strokes associated with the characters of that word are then divided into three categories, including:

Category 1: Strokes for which the segmentation will be changed. In a tested embodiment, strokes within about 5 mm of the user's tap location were placed into this category since it is expected that the user actually taps or selects what she perceives to be a segmentation error, however, this distance will depend on various factors such as, for example, the displayed size of the characters;

Category 2: Strokes for which the segmentation may change. In general, these are one or more strokes that are close neighbors (in either direction, as discussed above) of the user-selected character or strokes in category 1 for which the segmentation will be changed; and Category 3: Strokes not in either category 1 or category 2. The segmentation for these strokes is not changed unless subsequently selected by the user, or unless they are close neighbors to subsequently selected strokes.

Given the aforementioned categories of strokes for which the segmentation may or not be changed (e.g., categories 1 and 2), some threshold number (e.g., 32) of most likely alternate segmentations is computed using the aforementioned segmentation algorithm discussed above, while leaving the strokes in category 3 unchanged. This can be achieved by removing edges from the segmentation graph (see FIG. 6) that would lead to alternate segmentations for strokes in category 3, and determining scores for up to the threshold number of remaining paths. Note that depending upon the number of strokes being re-segmented, the total possible number of alternate paths may be less than the threshold number which sets an upper limit on the number of paths considered.

In various embodiments, given the set of most likely alternate segmentations discussed above, the Stroke Untangler automatically selects a single most likely alternate segmentation that is defined as a feasible path that meets the following criteria:

1. The selected alternate segmentation changes at least one of the strokes that fall into category 1; and
2. The selected alternate segmentation has the smallest impact on strokes that fall into category 2.

The above-described rule favors corrections that are localized, but also allows larger areas to change if the local change requires change in the larger area (i.e., possible changes to neighboring stroke segmentations). Further, using this rule enables the Stroke Untangler to automatically correct segmentations in real time as soon as the user taps or selects the characters with segmentation errors. In various alternate embodiments, the Stroke Untangler instead presents a display corresponding to two of more of the most likely alternate segmentations for user selection.

2.6 Overlapped Handwriting Recognition:

As described throughout this document, the Stroke Untangler leverages the automated untangling and segmentation of overlapping strokes to perform handwriting recognition of the corresponding human-readable characters. In other words, the Stroke Untangler provides an overlapped HWR process that first "untangles" strokes representing overlapping ink by grouping or segmenting overlapping strokes into characters and then performing a subsequent HWR processing of those human-readable characters.

In contrast to techniques that integrate untangling logic with handwriting recognition in a manner that requires the use of various HWR processing techniques as an aid to performing segmentation, the Stroke Untangler implements untangling as a separate, dedicated process that is performed without using HWR-based techniques as an aid or guide to performing segmentation. In other words, this pre-processing of strokes merely provides a grouping or segmentation of ink strokes into human-readable characters. The grouped or segmented characters are then sent to a standard (non-overlapped) HWR process which operates to return machine-readable text corresponding to the human-readable characters.

There are several advantages to the stroke segmentation process performed by the Stroke Untangler. For example, untangling and segmentation is simpler than full recognition, and therefore typically faster (and lower power) than existing HWR-based untangling and segmentation techniques. This makes it well suited for a real-time feedback loop that renders the entire handwritten word on the display while the user is entering strokes. Further, the above-described stroke segmentation process can leverage any existing HWR system, which are often highly optimized processes that cannot easily be modified to handle overlapping input.

2.6.1 Recognition Candidates:

As noted above, the Stroke Untangler provides various user-selectable word predictions and "semantic" recognition candidates in response to the handwritten characters input by the user. In particular, when the result from the HWR algorithm is fed to an application like a search algorithm, the latter may have access to a richer set of corrections or predictions than the HWR algorithm alone.

For example, if the user types "facebbock" in a search engine, typical search engines will respond with "facebook" as a search candidate. In such cases, the Stroke Untangler can show these more elaborate corrections and predictions as user-selectable entities directly in the candidate window or anywhere on the display screen. Note that an example of this concept was described above with respect to FIG. 5. In various embodiments, once the user has selected a particular recognition candidate, the input window is cleared and made ready for the next character input.

Word prediction is another technique enabled by the Stroke Untangler. For example, in various embodiments, the Stroke Untangler uses a statistical language model or the like to display the most likely completions of the current word, e.g. as the user writes "faceb", the candidate list would contain "facebook". This allows the user to complete the word entry with a single tap, leading to faster input speeds.

Note that since the Stroke Untangler displays the handwritten characters (i.e., the human-readable characters generated by segmentation and compositing techniques described herein) adjacent or near the recognition, prediction, suggestion, and/or correction candidates (or any combination of any or all of these), the user still has access to what she has actually written in handwriting. This has been observed to assist the user in relating to her input relative to the various recognition candidates being presented by the Stroke Untangler. This becomes increasingly useful when more sophisticated prediction algorithms or language models are used, and as the relationship between actually written input and the candidate becomes become more abstract. For example, in an extreme example, if the user writes "lowes" the Stroke Untangler can display "home depot" since both relate to home improvement type stores.

2.6.2 Out-of-Vocabulary Words or Character Strings:

Often, users would like to enter text that is not an actual word. Examples include passwords, unusual words not found in the dictionary (including words in another language), or expressive spellings (e.g., "whoooah"), etc. Consequently, in various embodiments of the Stroke Untangler these types of out-of-vocabulary words or character strings are allowed via the HWR process by initiating a recognition mode where suggestions include pure untangling and compositing as one of the choices (e.g., turn off spell-checking or word identification for at least one choice) to allow the user to input new words such as "woooah" or passwords having a mix of special characters, numbers and letters, such as, for example, "&4KrPqwS", etc. The Stroke Untangler can also achieve similar results by using the HWR system to perform character-by-character recognition without providing spelling or word corrections or suggestions. Note that in some embodiments, such results can be presented as alternates in a prediction list, rather than forcing the user to switch to a different recognition mode.

2.7 Additional Embodiments and Considerations:

As discussed above, the Stroke Untangler can be implemented in a wide range of form factors (e.g., smartphones, tablets, wristwatch type devices with touchscreens or touch-sensitive surfaces, or any other device having a real or virtual writing panel for which overlapping strokes can be tracked. Further, the machine-readable text produced as an output following the HWR process is made available to any of a wide variety of applications as a text input.

Consequently, given the wide range of devices upon which the Stroke Untangler can be implemented, and the ability of the Stroke Untangler to pass machine-readable text to any number of applications, there are many ways in which a user interface that employs some or all of the functionality described herein may be presented. Further, some of the different ways in which the user interface may be presented are related to the size of the display screen available on the device.

In view of these considerations, a few additional examples of some of the many embodiments and uses of the various features and capabilities of the Stroke Untangler are described below. It should be understood that these examples are note intended to limit the scope of any of the capabilities or user interface embodiments of the Stroke Untangler and that such examples are only provided for purposes of explanation.

2.7.1 Autocomplete with Samples of User's Handwriting:

As described throughout this document, the Stroke Untangler generates untangled and segmented characters and words in a human-readable format from overlapping strokes input by the user. As such, these human-readable characters and words are in the user's own handwriting. Consequently following the HWR process, a direct mapping exists between individual characters and words in the user's own handwriting and the corresponding machine-readable text.

Therefore, in various embodiments, the Stroke Untangler constructs a database or library (e.g., element 250 of FIG. 2) of actual samples of the strokes forming characters and words in the user's handwriting along with the corresponding machine-readable text. This database or library can then be used for a wide range of purposes.

For example, when selecting from various recognition candidates, search suggestions, or autocomplete suggestions, the Stroke Untangler can retrieve corresponding samples of characters from the user's character sample library to update the display of rendered characters to correspond to the user selection. The result is a display of letters, words, and/or phrases that are automatically rendered in the user's own handwriting by the character display module. Note that also allows the Stroke Untangler to correct spelling errors in user entered text while maintaining the user's own handwriting for the corresponding human-readable characters.

Other exemplary uses include, but are not limited to, handwriting-based texting applications where the user types or enters text either using any desired text (or voice) entry technique, with corresponding character samples from the sample library then being passed as human-readable images of text to another device or application. Note that the corresponding machine-readable text can be passed to the other device or application along with those human-readable images of the text.

Another Example

2.7.2 Whole Word Untangling:

In general, the segmentation algorithm and segmentation models of the Stroke Untangler are trained to support not just one character at a time, but also two or more characters or even entire words. Consequently, if the writing panel is sufficiently large, or if the user can write small enough, to enter strokes of two or more letters or even an entire word at once, the Stroke Untangler will operate, as described above, to untangle, segment, composite and recognize those multiple characters as a combined operation.

2.7.3 Search Engine Integration:

As described throughout this document, the Stroke Untangler automatically untangles and composites user-entered strokes to form characters representing letters, words or phrases. In various embodiments, text recognition is then performed on those characters and automatically provided as input to a search engine or the like. As with many search engines, in various embodiments, autocomplete functionality is used to provide search suggestions based on partial user input.

For example, as illustrated by FIG. 1, discussed above, user strokes untangled to produce characters that are subsequently recognized as the text "pizza" are used as a partial search input for autocomplete purposes. In response, the search engine returns multiple search suggestions, which in the example of FIG. 1 include "pizza hut," "pizza but menu," and "pizza but coupons." The user can then simply select any of these autocomplete suggestions to perform a search. Alternately, if the user does not want to accept any of the autocomplete suggestions, she can either perform a search based solely on the word "pizza" or simply continue to input additional strokes to provide additional character input (e.g., additional strokes to input characters representing the word "recipe"). Note also that as discussed with respect to FIG. 4, in various embodiments, when drawings are entered by the user, the Stroke Untangler performs either searches based on the image, or combined image and text searches.

2.7.4 Overlapping Strokes in Air or on Arbitrary Surfaces:

Various techniques for tracking finger motions, e.g., Microsoft® Kinect®, cameras, radio frequency-based tracking systems, laser-based tracking systems, etc., are well known to those skilled in the art. Such techniques and devices are adapted in various embodiments to track a fingertip of the user (or tip of a writing implement) while the user is making overlapping stroke motions in the air or on arbitrary surfaces such as, for example, a tabletop or the surface of a desk.

Further, as noted above, in various embodiments, direct input on a touch-screen is not required. Such strokes could be made on the touchpad of a laptop, for example, or on the back of a mobile device with a contact-sensitive surface. Further, such strokes can be made on one device (e.g., a watch, or touch-sensitive bracelet) and untangled (and presented to the user) on another device (e.g., a desktop computer, electronic whiteboard, or the like). Other examples include the "Touch Cover" or "Touch Cover 2" input devices associated with various Microsoft® Surface™ devices. Such devices include various combinations of capacitive-sensing techniques, pressure-sensing techniques, and proximity-sensing techniques. Such devices can be adapted (via various software or driver modifications) to receive stroke inputs by stroking on or above the tops of one or more of the pressure-sensitive or proximity-sensitive keys rather than merely sensing strokes on-screen or on-touch pad.

In other words, the user Stroke Untangler is capable of tracking overlapping finger strokes relative to arbitrary real or virtual surfaces using various tracking techniques. As with strokes input directly to a touchscreen or other touch-sensitive surface, the Stroke Untangler then automatically untangles and composites these strokes to form letters, words or phrases using some or all of the various techniques described throughout this document. The resulting human-readable characters are then processed using various HWR techniques to provide machine-readable text for use in any desired application, as discussed throughout this document.

Note also that in various embodiments, inertial tracking devices are worn on one or more fingers. Then, when those fingers move to create overlapping strokes in the air or on arbitrary surfaces, the motion of those fingers is tracked via the inertial tracking devices. The resulting motions are then considered by the Stroke Untangler as an input of overlapping strokes that are processed as discussed throughout this document.

2.7.5 Considering Samples of User's Handwriting for Security:

As noted above, in various embodiments, the Stroke Untangler collects learned character samples for the user based on actual samples of the user's writing. Consequently, these samples can be used for a wide range of purposes, such as the handwriting autocomplete techniques discussed above in Section 2.7.1. Another interesting use of these learned character samples is to consider whether the handwritten characters being input by the user are sufficiently close to examples of those characters stored in the learned character database. Various similarity metrics, such as, for example, existing image comparison or matching techniques, can be computed for this purpose. Then, in the case that the handwritten characters are a sufficiently close match for the stored character samples, the Stroke Untangler can accept those handwritten characters as a valid image-based password entry.

Further, this process can be used as a pre-curser to the above-described HWR processing of those characters. For example, when entering passwords or the like by untangling, segmenting and compositing strokes, the corresponding machine-readable text will not be passed as a password entry attempt unless the characters are a sufficiently close match to the user's handwriting. The result is a two-level authentication process that requires only one password to be entered. In other words, even if the recognized text provides the correct password, that password will be rejected where it appears to have been entered in the handwriting of a different user.

2.7.6 Stroke-Based Predictive Keyboard:

In various embodiments, the Stroke Untangler leverages the techniques for processing overlapping strokes for use in selectively populating a dynamic keyboard for user text entry. In other words, as illustrated by FIG. 7, a dynamic keyboard feature of the Stroke Untangler user interface automatically populates a small subset of selectable keys adjacent to spot where strokes are being entered based on untangling, segmenting, compositing and subsequent recognition of the resulting characters that is updated as each stroke is entered.

Figure 7:
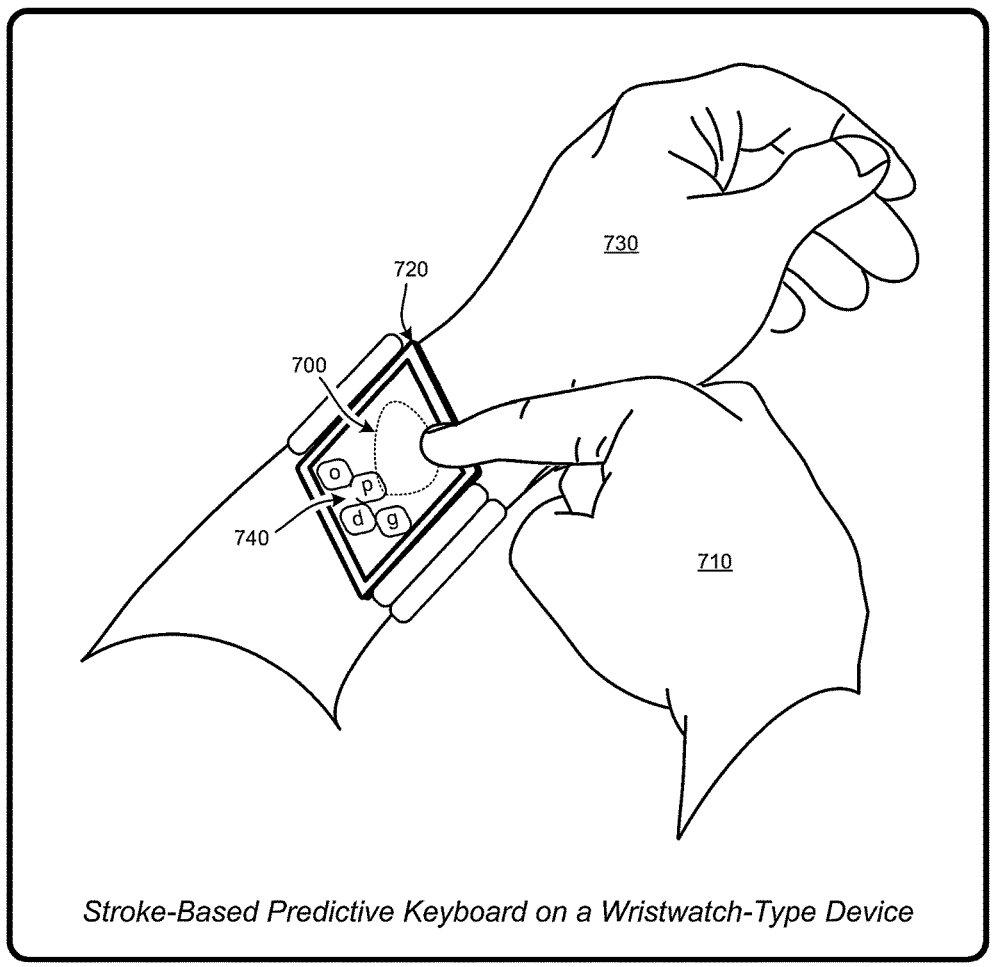
FIG. 7 illustrates an exemplary Stroke Untangler user interface showing a stroke based predictive keyboard on a wristwatch-type device where untangled, segmented and composited strokes are used to display a limited set of keys for user selection, as described herein.

For example, FIG. 7 shows a wristwatch type device 720, worn on the user's left hand 730 in this example, provides a writing panel for stroke entry by a finger the user's right hand 710. Further, as illustrated by FIG. 7, drawing a stroke in the approximate shape of a circle 700 would be recognized by HWR processing of that stroke as the start of an "o", "p", "d", "g", etc. Consequently, a dynamic keyboard consisting of one or more user-selectable keys 740 that provide a most likely match the user-entered strokes are displayed relative to the user stroke 700.

Then, as more strokes are entered, the set of keys comprising the dynamic keyboard may change (either by letter, character, or the total number and/or size of the displayed keys) until either a user selection of one of the keys is made, or until the HWR processing automatically determines what that character is beyond some threshold likelihood of match. The machine-readable text resulting from user selection of one or more of the keys of this dynamic keyboard is then used any desired purpose. Note also that keys can be sized in terms of their likelihood of match to the user strokes, with more likely matches being displayed larger than less likely matches to the user strokes.

2.7.7 Remote HWR Processing of Human-Readable Characters:

In general, the untangling and segmenting techniques described above use relatively small amounts of computational resources to operate in real-time. However, HWR-based techniques for subsequent processing of the resulting human-readable characters typically significantly more computational resources. Consequently, in various embodiments, the Stroke Untangler uses a remote server or cloud-based system to perform HWR-processing of human-readable characters transmitted from the user's device. In other words, in various embodiments, the HWR-based processing is performed by a remote service while the untangling is preformed locally.

In this case, an image (or, in various embodiments, 2D trajectories or any other mathematical representation of curves describing the strokes) of the human-readable characters is sent to the remote service in real-time as the untangling is happening. The remote service then periodically sends back one or more recognition candidates derived from one or more dictionaries, language models, search engine based search suggestions, etc. In other words, a local untangled ink display is provided in real-time as the user enters strokes, while the remote HWR system provides periodic updates. In a tested embodiment, periodic HWR-based updates back to the user's device were provided at intervals on the order of about 500 ms, while local stroke segmentation and display was presented to the user in real-time.

Such embodiments are advantageous in that they allow computationally expensive tasks, such as HWR-based processing of character images, to be performed remotely while minimizing the computational load, and corresponding power expenditures, on the user's device. This is especially advantageous in the case that a small device such as a watch-based form factor (see FIG. 7) or some other small wearable or stick-on touchscreen based device has limited computational capabilities and limited power resources but does have a communications capability for sending and receiving data.

2.7.8 Sketch-Based Autocomplete Functionality:

As discussed above, in various embodiments, the Stroke Untangler includes a drawing mode that allows users to enter sketches where the strokes are not untangled (see FIG. 4). HWR processing of these drawings may return character combinations corresponding to common text-to-icon type autocomplete scenarios. For example, if the user enters a sketch using strokes representing a colon adjacent to a right-parentheses character, i.e., ": )" in various embodiments, the Stroke Untangler autocompletes with a smiley face ascii type character. Note also that in the text entry mode, entry of these same character strokes can also be used to autocomplete or return a corresponding smiley face icon or the like. Similar character-based autocompletes or suggestions based on any desired relationships between characters and icons are enabled by various embodiments of the Stroke Untangler.

Further, as noted above, in various embodiment, the Stroke Untangler performs searches based on user entered drawings or sketches. In this case, such searches are used to return one or more clipart type images or photographs that can entered either automatically or selected by the user.

Figure 8:
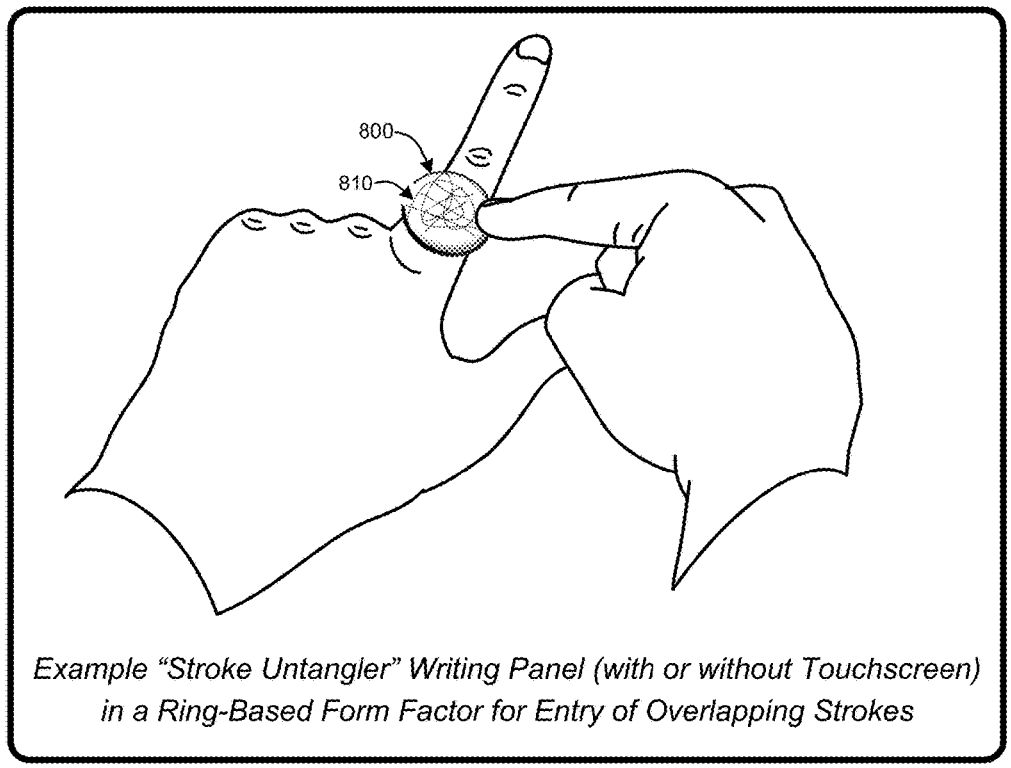
FIG. 8 illustrates an example of a writing pane in a ring-based form factor, with either a touchscreen or a touch-sensitive surface, upon which the user can enter overlapping strokes for processing by the Stroke Untangler, as described herein.

2.7.9 Other Form Factors for Implementing the Stroke Untanqler:

As noted above the Stroke Untangler can be implemented in a wide range of form factors, including, but not limited to smartphones, tablets, wristwatch type devices with or without touchscreens, ring-based devices that can be worn on a user's finger, or any other device having a real or virtual writing panel for which overlapping strokes can be tracked. For example, FIG. 8 illustrates an example of a writing panel 800, with either a touchscreen, or a touch-sensitive surface, upon which the user can enter overlapping strokes 810 for processing by the Stroke Untangler, as described herein.

2.7.10 Automatic Kerning of Handwritten Characters:

In various embodiments, the Stroke Untangler uses either or both negative and positive kerning to adjust spacing between one or more of the human-readable characters that are rendered on the display device as the user is entering strokes.

In general, kerning is the process of adjusting the spacing between characters in a proportional font, usually to achieve a visually pleasing result. Kerning adjusts the space between individual letter forms, while tracking (letter-spacing) adjusts spacing uniformly over a range of characters. In digital typography, kerning is usually applied to letter pairs as a number by which the default character spacing should be increased or decreased: a positive value for an increase, a negative value for a decrease.

Negative kerning is typically used to fit capital letters such as, for example, "T", "V", "W", and "Y" closer to some other capital letters on either side, such as "A", and to some lower case letters on the right side, such as, for example, the combinations "Ta", "Te", and "To". Negative kerning is also sometimes used to fit a period or a comma closer to various letters or letter combinations. Examples of other combinations that use negative kerning include, but are not limited, to "FA", "LT", and "LY", and letters like "A", "L", and "h" followed by a quotation mark. Note that a sufficiently large negative kerning can also cause characters to partially overlap, such as, for example, where an "o" is placed very close to a "T", such that the top of the letter "T" may be directly above at least a portion of the letter "o", as in the kerned word "To".

In contrast, positive kerning is often used in conjunction with special characters and punctuation (for example, the lower case letter "f" followed by right parenthesis or quotation mark) to increase spacing between characters. Depending on the font, some small positive kerning may also be used for accented letters and for pairs, such as, for example, "Bo", "Dw", and "TY".

In various embodiments, the Stroke Untangler uses any of a variety of kerning techniques, either with or without bounding box based scaling of the human-readable characters, to construct characters, words and/or sentences from the overlapping strokes entered by the user. The resulting kerned human-readable characters have been observed to have a more visually appealing appearance relative to non-kerned versions of those same human-readable characters.

Figure 9:
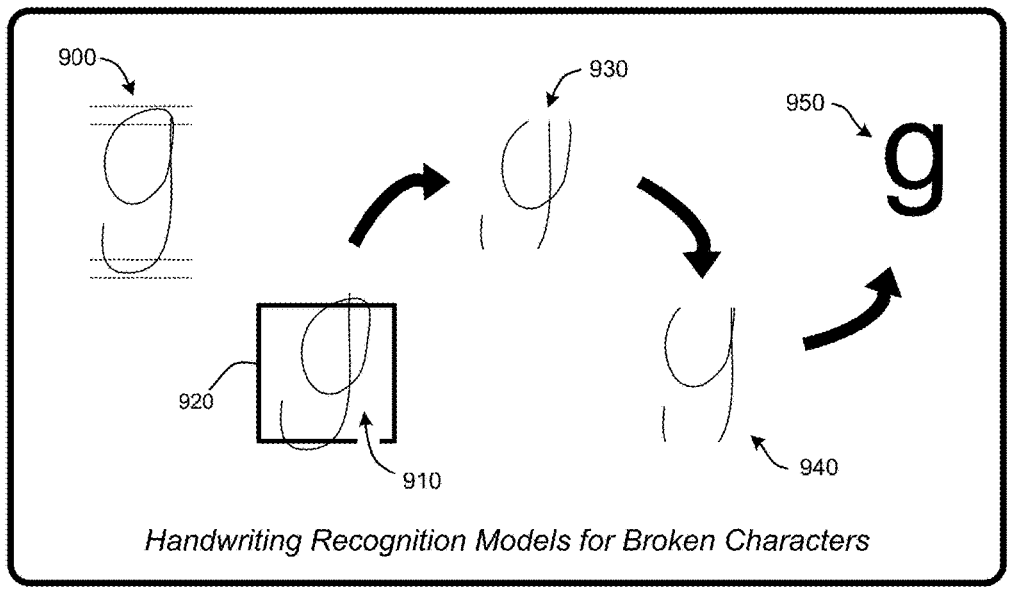
FIG. 9 illustrates the use of handwriting recognition models for processing broken characters formed from broken strokes (e.g., incomplete strokes resulting from crossing over edges of the writing panel while entering overlapping strokes), as described herein.

2.7.11 Recognition Models for Broken Characters:

In cases where the writing panel is relatively small, or where the user inputs relatively large strokes, it is possible that one or more of the overlapping strokes entered by the user may cross an edge of writing panel during entry such that the finger or writing implement is no longer in contact with the touch-sensitive surface of the writing panel. In such cases, where the Stroke Untangler determines that the stroke is not a control gesture, that stroke is inherently broken into two or more pieces, with each piece being interpreted as separate strokes by the Stroke Untangler for purposes of untangling, segmenting and compositing those strokes. The result of untangling, segmenting and compositing those strokes is then a partial or broken character that is presented for HWR processing. Consequently, in order to improve handwriting recognition in such cases, in various embodiments, one or more HWR processing models are trained on broken characters, where one or more of the top, bottom, left or right edges of the character are eliminated for training purposes For example, as illustrated by FIG. 9, a handwritten letter "g" 900, having some portion of the top and bottom removed, as illustrated by the broken lines on the top and bottom of that letter, is provided as a positive example of the letter "g" when training the HWR model. Then, when a user enters overlapping strokes 910 that cross the top and bottom edges of writing panel 920, the result is several broken overlapping strokes 930. The Stroke Untangler then untangles, segments and composites those strokes to produce ostensibly human-readable character 940. When the human-readable character 940 is subsequently passed to an HWR-processing module that includes one or more models trained on broken characters (e.g., handwritten letter "g" 900, having some portion of the top and bottom removed), the result is machine-readable letter "g" 950.

2.7.12 Post-Processing of Strokes:

In various embodiments, each of the overlapping strokes are processed either prior to, or after, the untangling, segmenting and compositing process to produce a variety of visual effects. For example, the individual curves forming each stroke can be filtered or modified using a variety of image processing techniques to create effects including, but not limited to the following:

Rendering each stroke to appear as it were drawn using a pencil;
Rendering each stroke to appear as it were drawn using various types of pens;
Rendering each stroke to appear as it were painted using a variety of paintbrush types or sizes;
Rendering each stroke in one or more selected colors;
Rendering each stroke using any of a variety of fill patterns;

Rendering each stroke using any of a variety of shading effects;

Smoothing each stroke using spline-based representations of each stroke or any other desired smoothing or filtering technique;

Rendering composited strokes or human-readable characters onto any desired background, e.g., parchment paper, images, etc.

Etc.

Figure 10:
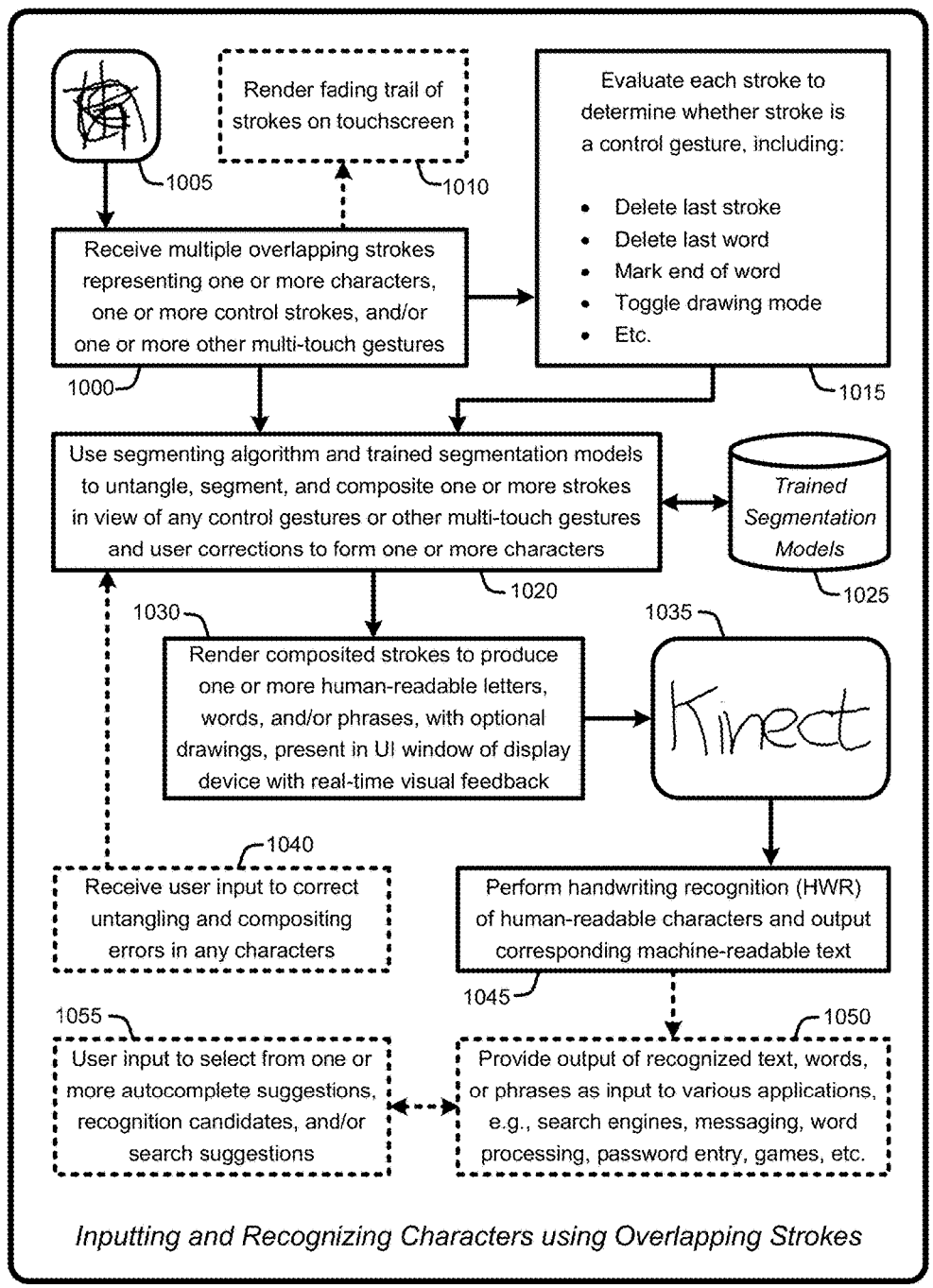
FIG. 10 provides a general flow diagram that illustrates exemplary methods for implementing various embodiments of the Stroke Untangler, as described herein.

3.0 Operational Summary of the Stroke Untangler:

The processes described above with respect to FIG. 1 through FIG. 9, and in further view of the detailed description provided above in Sections 1 and 2, are illustrated by the general operational flow diagram of FIG. 10. In particular, FIG. 10 provides an exemplary operational flow diagram that summarizes the operation of some of the various embodiments of the Stroke Untangler. Note that FIG. 10 is not intended to be an exhaustive representation of all of the various embodiments of the Stroke Untangler described herein, and that the embodiments represented in FIG. 10 are provided only for purposes of explanation.

Further, it should be noted that any boxes and interconnections between boxes that are represented by broken or dashed lines in FIG. 10 represent optional or alternate embodiments of the Stroke Untangler described herein, and that any or all of these optional or alternate embodiments, as described below, may be used in combination with other alternate embodiments that are described throughout this document.

In general, as illustrated by FIG. 10, the Stroke Untangler begins operation by receiving (1000) multiple overlapping strokes (e.g., 1005) representing one or more characters, one or more control strokes, and/or one or more other multi-touch gestures. In various embodiments, the Stroke Untangler optionally renders (1010) a fading trail of strokes on the touchscreen used to enter those strokes. The Stroke Untangler then evaluates (1015) each stroke to determine whether stroke is a control gesture, such as, for example, a delete last stroke gesture, a delete last word gesture, a mark end of word or insert space gesture, a toggle drawing mode gesture, etc.

The Stroke Untangler then uses (1020) the aforementioned segmentation algorithm and trained segmentation models (1025) to untangle, segment, and composite one or more strokes in view of any control gestures or other multi-touch gestures and user corrections to form one or more characters. Once the segmentation process has completed, the Stroke Untangler renders 1030 composited strokes to produce one or more human-readable characters (1035), e.g., letters, words, and/or phrases, which are presented, with optional drawings or sketches, in a user interface window of display device to provide real-time visual feedback to the user. As discussed above, in various embodiments, the Stroke Untangler also receives (1040) user input to correct untangling and compositing errors in any characters (e.g., using the aforementioned tap-to-correct process).

The Stroke Untangler then performs (1045) handwriting recognition (HWR) of human-readable characters (1035) and outputs corresponding machine-readable text. The Stroke Untangler then optionally provides (1050) this output of recognized text, words, or phrases as input to various applications, e.g., search engines, messaging, word processing, password entry, games, etc. Finally, in various embodiments, the Stroke Untangler receives user input (1055) to select from one or more autocomplete suggestions, recognition candidates, and/or search suggestions.

Figure 11:
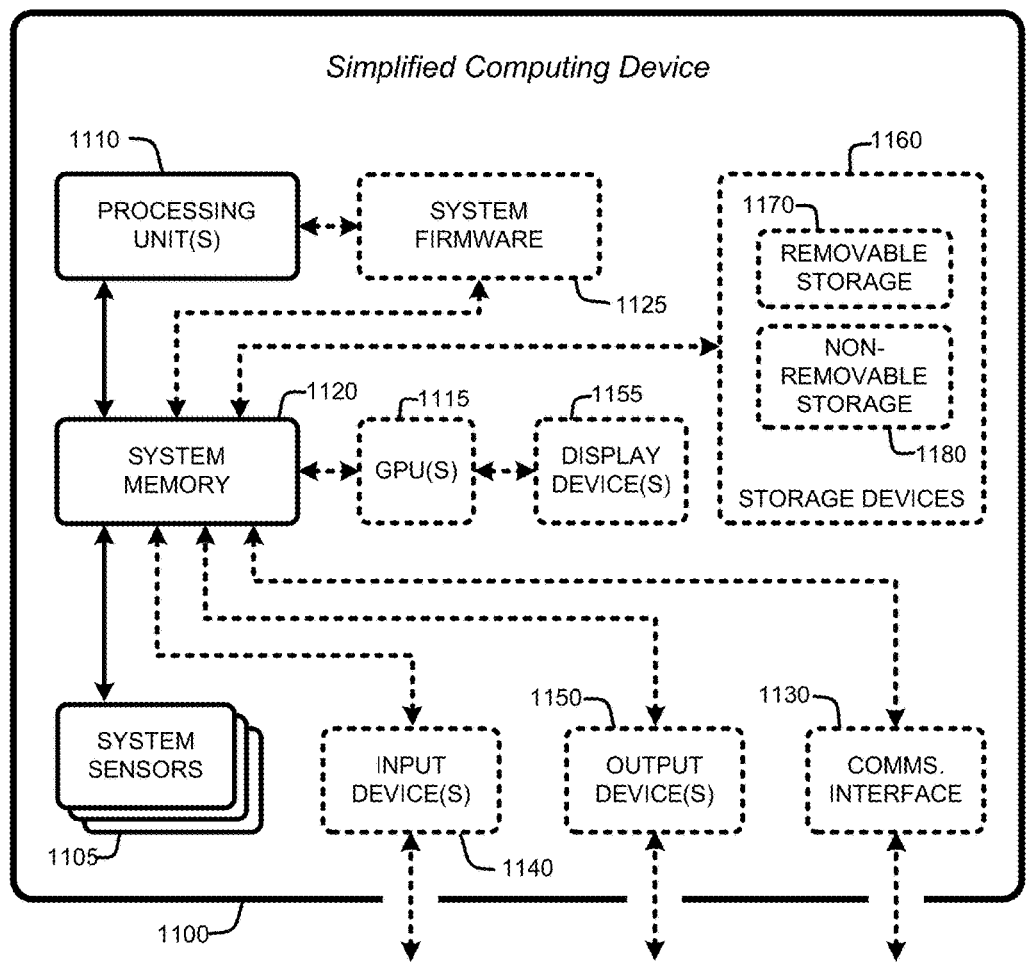
FIG. 11 is a general system diagram depicting a simplified general-purpose computing device having simplified computing and I/O capabilities for use in implementing various embodiments of the Stroke Untangler, as described herein.

4.0 Exemplary Operating Environments:

The Stroke Untangler described herein is operational within numerous types of general purpose or special purpose computing system environments or configurations. FIG. 11 illustrates a simplified example of a general-purpose computer system on which various embodiments and elements of the Stroke Untangler, as described herein, may be implemented. It should be noted that any boxes that are represented by broken or dashed lines in FIG. 11 represent alternate embodiments of the simplified computing device, and that any or all of these alternate embodiments, as described below, may be used in combination with other alternate embodiments that are described throughout this document.

For example, FIG. 11 shows a general system diagram showing a simplified computing device 1100. Examples of such devices operable with the Stroke Untangler, include, but are not limited to, portable electronic devices, wearable computing devices, hand-held computing devices, laptop or mobile computers, communications devices such as cell phones, smartphones and PDA's, multiprocessor systems, microprocessor-based systems, set top boxes, programmable consumer electronics, network PCs, minicomputers, audio or video media players, handheld remote control devices, etc. Note also that as discussed above, the Stroke Untangler may be implemented with any touchscreen or touch-sensitive surface that is in communication with, or otherwise coupled to, a wide range of electronic devices or objects.

To allow a device to implement the Stroke Untangler, the computing device 1100 should have a sufficient computational capability and system memory to enable basic computational operations. In addition, the computing device 1100 includes one or more sensors 1105, including, but not limited to, accelerometers, cameras, capacitive sensors, proximity sensors, microphones, multi-spectral sensors, etc. Further, the computing device 1100 may also include optional system firmware 1125 (or other firmware or processor accessible memory or storage) for use in implementing various embodiments of the Stroke Untangler.

As illustrated by FIG. 11, the computational capability of computing device 1100 is generally illustrated by one or more processing unit(s) 1110, and may also include one or more GPUs 1115, either or both in communication with system memory 1120. Note that that the processing unit(s) 1110 of the computing device 1100 may be a specialized microprocessor, such as a DSP, a VLIW, or other microcontroller, or can be a conventional CPU having one or more processing cores, including specialized GPU-based cores in a multi-core CPU.

In addition, the simplified computing device 1100 may also include other components, such as, for example, a communications interface 1130. The simplified computing device 1100 may also include one or more conventional computer input devices 1140 or combinations of such devices (e.g., touchscreens, touch-sensitive surfaces, pointing devices, keyboards, audio input devices, voice or speech-based input and control devices, video input devices, haptic input devices, devices for receiving wired or wireless data transmissions, etc.). The simplified computing device 1100 may also include other optional components, such as, for example, one or more conventional computer output devices 1150 (e.g., display device(s) 1155, audio output devices, video output devices, devices for transmitting wired or wireless data transmissions, etc.). Note that typical communications interfaces 1130, input devices 1140, output devices 1150, and storage devices 1160 for general-purpose computers are well known to those skilled in the art, and will not be described in detail herein.

The simplified computing device 1100 may also include a variety of computer readable media. Computer readable media can be any available media that can be accessed via storage devices 1160 and includes both volatile and non-volatile media that is either removable 1170 and/or non-removable 1180, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Stroke Untangler described herein, or portions thereof, may be stored, received, transmitted, or read from any desired combination of computer or machine readable media or storage devices and communication media in the form of computer executable instructions or other data structures.

Finally, the Stroke Untangler described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Stroke Untangler has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Stroke Untangler. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for receiving text input, comprising:
  using a computer to perform process actions for:
  receiving multiple overlapping strokes from a writing panel;
  the overlapping strokes comprising one or more full strokes and one or more broken strokes, one or more of the broken strokes extending past one or more edges of the writing panel and continuing back into the writing panel, such that any portions of any broken strokes extending past any edge of the writing panel are not received and such that one or more of the broken strokes is inherently separated into two or more received pieces by continuing back into the writing panel;
  automatically segmenting and compositing the overlapping strokes, including the received pieces of the broken strokes, to form one or more human-readable characters prior to performing handwriting-based recognition of any of the strokes or human-readable characters; and
  after one or more human-readable characters have been formed, performing handwriting-based recognition of those human-readable characters to generate corresponding machine-readable text.

2. The computer-implemented process of claim 1 wherein the handwriting-based recognition is performed on a character-by-character basis.

3. The computer-implemented process of claim 1 wherein the handwriting-based recognition is performed on a full word basis.

4. The computer-implemented process of claim 1 wherein a user interface displays a scaled representation of the automatic segmentation and compositing of overlapping strokes in real-time as the strokes are being entered.

5. The computer-implemented process of claim 1 wherein a user interface displays a fading trail of each stroke in real-time as the stroke is being entered.

6. The computer-implemented process of claim 1 wherein a user interface displays one or more selectable recognition candidates corresponding to the machine-readable text.

7. The computer-implemented process of claim 6 wherein the recognition candidates include any combination of dictionary-based suggestions and search-based suggestions.

8. The computer-implemented process of claim 1 wherein a user interface includes a drawing mode that allows the entry of sketches formed from strokes that are not segmented and composited to form human-readable characters.

9. The computer-implemented process of claim 1 wherein one or more segmentation models used to automatically segment and composite the overlapping strokes are automatically re-trained following handwriting-based recognition of one or more human-readable characters using samples of recognized human-readable characters as positive examples for re-training the segmentation models.

10. The computer-implemented process of claim 1 wherein a user interface displays:
   a scaled representation of the automatic segmentation and compositing of overlapping strokes in real-time as the strokes are being entered;
   one or more selectable recognition candidates corresponding to the machine-readable text; and
   one or more selectable search suggestions based on a most likely one of the selectable recognition candidates.

11. A system for receiving text input, comprising:
   a processor; and
   a memory comprising a stroke untangler component that is executed by the processor, the stroke untangler component configured to:
   receive an input of multiple overlapping strokes from a writing panel;
   the overlapping strokes comprising one or more full strokes and one or more broken strokes, one or more of the broken strokes extending past one or more edges of the writing panel and continuing back into the writing panel, such that any portions of any broken strokes extending past any edge of the writing panel are not received and such that one or more of the broken strokes is inherently separated into two or more received pieces by continuing back into the writing panel;
   segment and composite the overlapping, including the received pieces of the broken strokes, to form one or more human-readable characters prior to performing handwriting-based recognition of any of the strokes or human-readable characters; and
   perform handwriting-based recognition of the human-readable characters to generate corresponding machine-readable text.

12. The system of claim 11 wherein the writing panel is a touch-sensitive surface for tracking and receiving the overlapping stroke inputs.

13. The system of claim 11 wherein the writing panel is a virtual surface associated with a tracking device that tracks stroke motions relative to the virtual surface and provides those stroke motions as the overlapping stroke inputs.

14. The system of claim 11 wherein a user interface on a display device displays a scaled representation of the automatic segmentation and compositing of overlapping strokes in real-time as the strokes are being entered.

15. The system of claim 11 wherein a user interface on a display device displays:
   a scaled representation of the automatic segmentation and compositing of overlapping strokes in real-time as the strokes are being entered; and
   one or more selectable recognition candidates corresponding to the machine-readable text.

16. The system of claim 15 wherein the user interface displays one or more selectable search suggestions based on a most likely one of the selectable recognition candidates.

17. A computer-readable storage device having computer executable instructions stored therein for receiving a text input, said instructions causing a computing device to execute a method comprising:
   receiving a plurality of overlapping strokes on a touchscreen;
   the overlapping strokes comprising one or more full strokes and one or more broken strokes, one or more of the broken strokes extending past one or more edges of the touchscreen and continuing back into the touchscreen, such that any portions of any broken strokes extending past any edge of the touchscreen are not received and such that one or more of the broken strokes is inherently separated into two or more received pieces by continuing back into the touchscreen;
   segmenting and compositing the overlapping strokes, including the received pieces of the broken strokes, to form one or more human-readable characters prior to performing any handwriting-based recognition of any of the strokes or human-readable characters; and
   performing handwriting-based recognition of the human-readable characters to generate corresponding machine-readable text.

18. The computer-readable storage device of claim 17 wherein one or more segmentation models used to automatically segment and composite the overlapping strokes are automatically re-trained following handwriting-based recognition of one or more human-readable characters using samples of recognized human-readable characters as positive examples for re-training the segmentation models.

19. The computer-readable storage device of claim 17 wherein a library of recognized human-readable characters constructed by storing one or more of those human-readable characters in combination with an identification of corresponding machine-readable text following the handwriting-based recognition of the human-readable characters.

20. The computer-readable storage device of claim 17 wherein a user interface on a display device displays any combination of:
   a fading trail of each stroke in real-time as the stroke is being entered;
   a scaled representation of the automatic segmentation and compositing of overlapping strokes in real-time as the strokes are being entered;
   one or more selectable recognition candidates corresponding to the machine-readable text; and
   one or more selectable search suggestions based on a most likely one of the selectable recognition candidates.

* * * * *